(12) United States Patent
Yasuda

(10) Patent No.: US 8,773,977 B2
(45) Date of Patent: Jul. 8, 2014

(54) PACKET RECEIVING DEVICE, PACKET COMMUNICATION SYSTEM, AND PACKET REORDERING METHOD

(75) Inventor: Masato Yasuda, Tokyo (JP)

(73) Assignee: NEC Corporation, Tokyo (JP)

(*) Notice: Subject to any disclaimer, the term of this patent is extended or adjusted under 35 U.S.C. 154(b) by 125 days.

(21) Appl. No.: 13/198,612

(22) Filed: Aug. 4, 2011

(65) Prior Publication Data

US 2011/0292945 A1    Dec. 1, 2011

Related U.S. Application Data

(63) Continuation of application No. PCT/JP2010/071644, filed on Dec. 3, 2010.

(30) Foreign Application Priority Data

Dec. 3, 2009    (JP) ................. 2009-275930

(51) Int. Cl.
| | |
|---|---|
| *G06F 11/00* | (2006.01) |
| *H04L 1/00* | (2006.01) |
| *H04L 12/26* | (2006.01) |
| *H04L 12/28* | (2006.01) |
| *G06F 15/16* | (2006.01) |
| *G06F 15/173* | (2006.01) |
| *H04L 1/18* | (2006.01) |

(52) U.S. Cl.
USPC ........... 370/216; 370/231; 370/235; 370/252; 370/394; 370/469; 709/230; 709/238; 714/749

(58) Field of Classification Search
USPC ......... 370/394, 401, 216, 252, 469, 231, 235; 709/201, 227, 230, 238; 714/749
See application file for complete search history.

(56) References Cited

U.S. PATENT DOCUMENTS 6,738,379 B1 * 5/2004 Balazinski et al. ........... 370/394
2003/0174707 A1    9/2003 Grob et al.

(Continued)

FOREIGN PATENT DOCUMENTS

| JP | 2005-520435 | 7/2004 |
| JP | 2006-033019 | 2/2006 |

(Continued)

OTHER PUBLICATIONS

International Search Report (ISR) (PCT Form PCT/ISA/210) dated Mar. 1, 2011, with English translation.

(Continued)

*Primary Examiner* — Alpus H Hsu
*Assistant Examiner* — Anthony Luo
(74) *Attorney, Agent, or Firm* — McGinn IP Law Group, PLLC

(57) ABSTRACT

Under an environment where a packet retransmission is performed, a packet receiving device includes a reordering section, configured to perform a reordering of a receiving packet in a lower layer than a network protocol stack, and a buffer section. Out-of-Order packet among receiving packets is associated with a flow and stored in the buffer section. The reordering section determines whether the receiving packet is an In-Order packet or an Out-of-Order packet. In a case where the receiving packet is an In-Order packet of a flow and an Out-of-Order packet of the flow is stored in the buffer section, the reordering section transfers the receiving packet to the network protocol stack and then transfers all of Out-of-Order packet of the flow stored in the buffer section to the network protocol stack.

22 Claims, 16 Drawing Sheets

(56) References Cited

U.S. PATENT DOCUMENTS

| | | | |
|---|---|---|---|
| 2006/0098662 A1* | 5/2006 | Gupta et al. | 370/401 |
| 2007/0184840 A1* | 8/2007 | Zhang et al. | 455/442 |
| 2007/0233721 A1 | 10/2007 | Bazar | |
| 2009/0006521 A1* | 1/2009 | Veal et al. | 709/201 |
| 2009/0172171 A1* | 7/2009 | Amir | 709/227 |
| 2009/0225771 A1 | 9/2009 | Yasuda | |

FOREIGN PATENT DOCUMENTS

| | | |
|---|---|---|
| JP | 2006-211136 | 8/2006 |
| JP | 2007-181127 | 7/2007 |
| JP | 2007-281808 | 10/2007 |
| JP | 2008-278014 | 11/2008 |
| JP | 2009-171529 | 7/2009 |
| JP | 2009-213065 | 9/2009 |

OTHER PUBLICATIONS

Toru Takamichi et al. "Ultra-High Speed MAC Technology for Terabit-Class LAN" Proceedings of The Institute of Electronics, Information and Communication Engineers Communications Society Conference, 2008.

Motorola, Stop of the reordering function, TSG-RAN WG2 Meeting #62bis R2-083473, Jun. 23, 2008.

Written Opinion of the ISA dated Jan. 3, 2011 (and English Translation Thereof).

* cited by examiner

1: PACKET COMMUNICATION SYSTEM

61: EXPECTED SEQUENCE NUMBER INFORMATION

| FLOW IDENTIFICATION INFORMATION | EXPECTED SEQUENCE NUMBER |
|---|---|
| FLOW A | |
| FLOW B | |
| FLOW C | |
| ⋮ | |

PACKET RECEIVING DEVICE, PACKET COMMUNICATION SYSTEM, AND PACKET REORDERING METHOD

CROSS-REFERENCE TO RELATED APPLICATION

This is a continuation of International Application No. PCT/JP2010/071644, filed on Dec. 3, 2010.

TECHNICAL FIELD

The present invention relates to packet communication. The present invention particularly relates to packet retransmission control and packet reordering in the packet communication.

BACKGROUND ART

One of roles of TCP (Transmission Control Protocol) in a transport layer is to ensure reliability of packet communication. There is a technique for ensuring the reliability of the packet communication known as "packet transmission control".

Specifically, a transmission device transmits a packet to a receiving device, and the receiving device receives the packet and then returns acknowledgement to the transmission device. With this acknowledgement, the transmission device recognizes that the transmitted packet safely arriving at the receiving device. However, for example, in the case where the packet is discarded in a network between the transmission device and the receiving device, the transmission device does not receive the acknowledgement relative to the packet. After transmitting the packet, in the case of not receiving the acknowledgement within predetermined stand-by time, the transmission device transmits the packet to the receiving device again. It should be noted that the predetermined stand-by time is called as "RTO (Retransmission Time Out)".

Such a technique relating to the packet retransmission control is described in a patent literature 1 (JP2007-181127A), a patent literature 2 (JP2008-278014A), and a non patent literature 1 (Toru Takamichi, et al. "Ultra-High Speed MAC Technology for Terabit-Class LAN", IEICE Communications Society Conference, 2008).

According to the non patent literature 1, in a MAC (Media Access Control) layer which is lower than the transport layer, the packet retransmission control is performed. A reason for this is as follows. As an example, a network having significantly short RTT (Round Trip Time) such as a network in a data center will be taken into consideration. In such a network, by shortening the retransmission time out to a micro-second level, FCT (Flow Completion Time) is decreased, so that communication efficiency can be improved. However, since the TCP is generally mounted in an OS (Operating System), the retransmission time out cannot be shortened to the micro-second level in the packet retransmission control by the TCP. For example, since unit time (Jiffies) in Linux is 10 milliseconds, the retransmission time out cannot be shortened to less than 10 milliseconds by standard TCP of Linux. In order to solve such a problem, according to the non patent literature 1, the packet retransmission control is performed in the MAC layer, and thereby the retransmission time out is shortened to the micro-second level.

Meanwhile, when the above packet retransmission control is performed, the order of the packet arriving at the receiving device is switched. Therefore, the receiving device is required to sort receiving packets in order. This processing is "packet reordering". This packet reordering is one of functions of the TCP.

A patent literature 3 (JP2007-281808A) discloses a technique relating to the packet reordering. A packet communication device described in the patent literature 3 is provided with sorting processing means, timer control means, retransmission counter, and receiving packet reordering means. The sorting processing means retains arriving packets in a packet data sorting buffer and sorts the packets in order. In the case where the packet does not arrive within fixed time, the timer control means performs timer control of giving up normal reception in the sorting processing means and entrusting to retransmission in an upper layer. The retransmission counter counts up the number of the retransmission of a non-receiving packet started up at the time of a non-continuous reception stand-by state. When the number of the retransmission counted up by the retransmission counter reaches to the predetermined number of the retransmission, the receiving packet reordering means gives up the reception stand-by state and transmits the packet which is already received to the upper layer.

CITATION LIST

Patent Literature

Patent Literature 1: JP2007-181127A
Patent Literature 2: JP2008-278014A
Patent Literature 3: JP2007-281808A

NON-PATENT LITERATURE

Non Patent Literature 1: Toru Takamichi, et al. "Ultra-High Speed MAC Technology for Terabit-Class LAN", IEICE Communications Society Conference, 2008.

SUMMARY OF THE INVENTION

As described above, the TCP on the receiving side is required to perform the packet reordering in an environment where the packet retransmission control is performed. This packet reordering increases a load applied onto a "network protocol stack" including the TOP. Since the network protocol stack is also required to provide various other functions, the load, by the packet reordering is desirably reduced as far as possible.

One object of the present invention is to reduce the load of the packet reordering applied onto the network protocol stack.

In one aspect of the present invention, a packet receiving device is provided. The packet receiving device is provided with an acknowledgement section for acknowledging a receiving packet received from a packet transmission device and returning acknowledgement to the packet transmission device. After transmission of a transmission packet, in the case of not receiving the acknowledgement relative to the transmission packet within predetermined time, the packet transmission device retransmits the transmission packet. The packet receiving device is further provided with a network protocol stack having a function of performing reordering of the receiving packet, a reordering section for performing reordering of the receiving packet in a lower layer than the network protocol stack, and a buffer section. An Out-of-Order packet among the receiving packets is stored in the buffer section while being associated with a flow. The reordering section determines whether the receiving packet is an In- Order packet or the Out-of-Order packet. In the case where the receiving packet is the In-Order packet, the reordering section transfers the receiving packet to the network protocol stack. In the case where the receiving packet is the In-Order packet of a certain flow and the Out-of-Order packet of the flow is stored in the buffer section, the reordering section transfers the receiving packet to the network protocol stack, and then transfers all the Out-of-Order packets of the flow stored in the buffer section to the network protocol stack.

In one of other aspects of the present invention, a packet communication system is provided. The packet communication system is provided with a packet transmission device for transmitting a transmission packet, and a packet receiving device for receiving the transmission packet from the packet transmission device as a receiving packet. The packet receiving device is provided with an acknowledgement section for acknowledging the receiving packet and returning acknowledgement to the packet transmission device. After transmitting the transmission packet to the packet receiving device, in the case of not receiving the acknowledgement relative to the transmission packet within predetermined time, the packet transmission device performs packet retransmission control of retransmitting the transmission packet to the packet receiving device. The packet receiving device is further provided with a network protocol stack having a function of performing reordering of the receiving packet, a reordering section for performing reordering of the receiving packet in a lower layer than the network protocol stack, and a buffer section. An Out-of-Order packet among the receiving packets is stored in the buffer section while being associated with a flow. The reordering section determines whether the receiving packet is the In-Order packet or the Out-of-Order packet. In the case where the receiving packet is the In-Order packet, the reordering section transfers the receiving packet to the network protocol stack. In the case where the receiving packet is the In-Order packet of a certain flow and the Out-of-Order packet of the flow is stored in the buffer section, the reordering section transfers the receiving packet to the network protocol stack, and then transfers all the Out-of-Order packets of the flow stored in the buffer section to the network protocol stack.

In further one of other aspects of the present invention, a packet reordering method in a packet receiving device is provided. The packet receiving device is provided with an acknowledgement section for acknowledging a receiving packet received from a packet transmission device and returning acknowledgement to the packet transmission device. After transmission of a transmission packet, in the case of not receiving the acknowledgement relative to the transmission packet within predetermined time, the packet transmission device retransmits the transmission packet. The packet receiving device is further provided with a network protocol stack having a function of performing reordering of the receiving packet, and a buffer section. An Out-of-Order packet among the receiving packets is stored in the buffer section while being associated with a flow. The packet reordering method according to the present invention includes the step of performing reordering of the receiving packet in a lower layer than the network protocol stack. This step of reordering includes the steps of: (A) determining whether the receiving packet is an In-Order packet or the Out-of-Order packet; (B) in the case where the receiving packet is the In-Order packet, transferring the receiving packet to the network protocol stack; and (C) in the case where the receiving packet is the In-Order packet of a certain flow and the Out-of-Order packet of the flow is stored in the buffer section, transferring the receiving packet to the network protocol stack and then transferring all the Out-of-Order packets of the flow stored in the buffer section to the network protocol stack.

In further one of other aspects of the present invention, a packet reordering program for having a packet receiving device execute packet reordering processing is provided. The packet receiving device is provided with an acknowledgement section for acknowledging a receiving packet received from a packet transmission device and returning acknowledgement to the packet transmission device. After transmission of a transmission packet, in the case of not receiving the acknowledgement relative to the transmission packet within predetermined time, the packet transmission device retransmits the transmission packet. The packet receiving device is further provided with a network protocol stack having a function of performing reordering of the receiving packet, and a buffer section. An Out-of-Order packet among the receiving packets is stored in the buffer section while being associated with a flow. The packet reordering processing according to the present invention includes the processing of performing reordering of the receiving packet in a lower layer than the network protocol stack. This processing of reordering includes the processing of: (A) determining whether the receiving packet is an In-Order packet or the Out-of-Order packet; (B) in the case where the receiving packet is the In-Order packet, transferring the receiving packet to the network protocol stack; and (C) in the case where the receiving packet is the In-Order packet of a certain flow and the Out-of-Order packet of the flow is stored in the buffer section, transferring the receiving packet to the network protocol stack and then transferring all the Out-of-Order packets of the flow stored in the buffer section to the network protocol stack.

According to the present invention, the load of the packet reordering applied onto the network protocol stack can be reduced.

BRIEF DESCRIPTION OF THE DRAWINGS

The above object and other objects, advantages, and features will be revealed by an embodiment of the present invention described with the following drawings.

DESCRIPTION OF EMBODIMENTS

Referring to the attached drawings, an embodiment of the present invention will be described.

1. Outline

Figure 1:
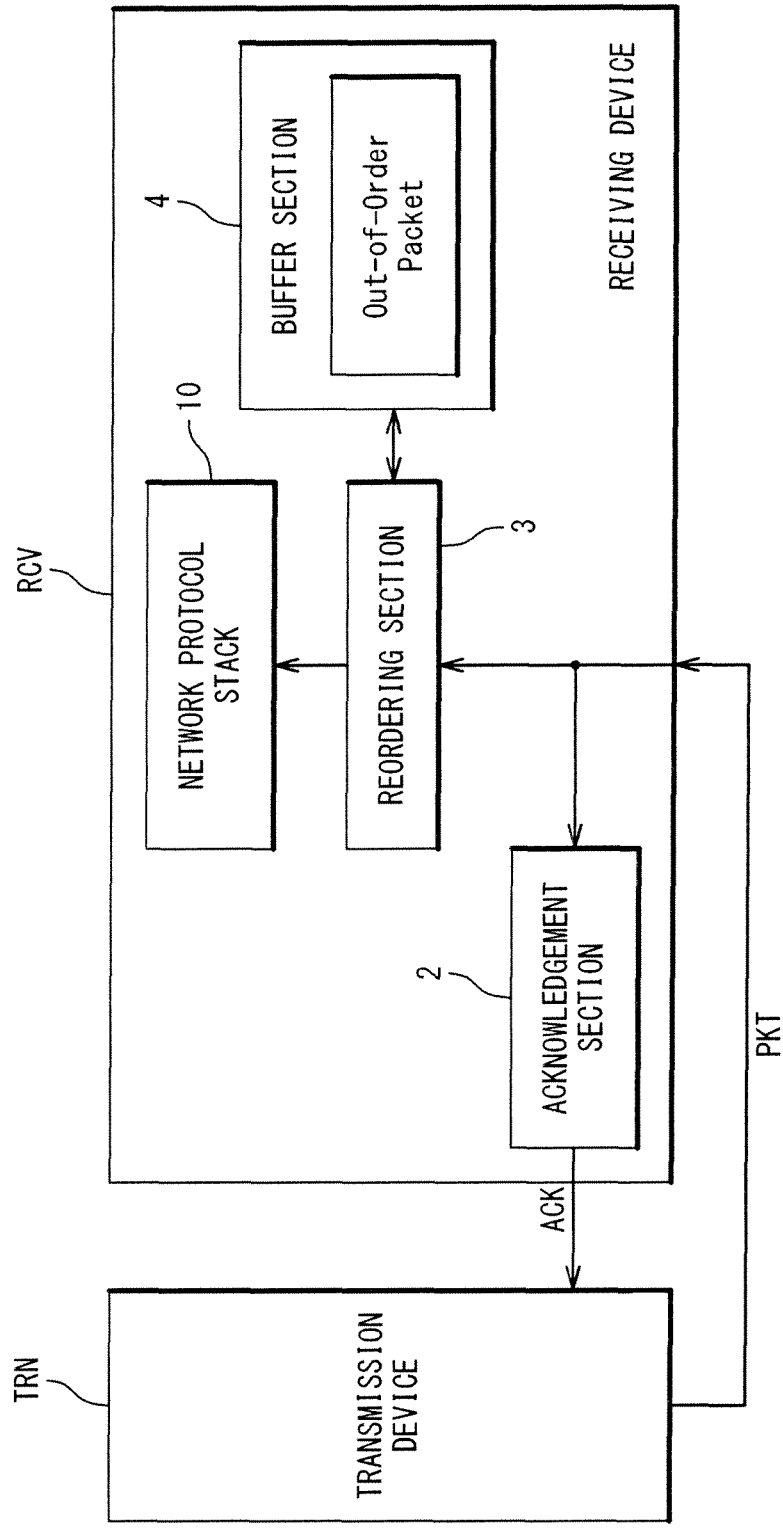
FIG. 1 is a block diagram schematically showing a configuration of a packet communication system in an embodiment of the present invention.

FIG. 1 is a block diagram schematically showing a configuration of a packet communication system 1 in the present embodiment. The packet communication system 1 is provided with a transmission device (packet transmission device) TRN, and a receiving device (packet receiving device) RCV. The transmission device TRN and the receiving device RCV are connected to each other via a network. The transmission device TRN transmits a packet PKT (transmission packet) to the receiving device RCV via the network. The receiving device RCV receives the packet PKT (receiving packet) from the transmission device TRN via the network.

However, there is sometimes the case where the packet PKT transmitted from the transmission device TRN is not correctly delivered to the receiving device RCV. For example, there is sometimes the case where the packet PKT is discarded in the middle of the network due to a bit error of a signal. There is also sometimes the case where a plurality of packets is continuously discarded due to network congestion (this is called as "burst discarding").

In order to respond to such packet discarding, "packet retransmission control" is performed. Specifically, the receiving device RCV is provided with an acknowledgement section 2. When receiving the packet PKT from the transmission device TRN, the acknowledgement section 2 acknowledges the receiving packet PKT and returns acknowledgement ACK to the transmission device TRN. In the case where a packet PKT is discarded in the middle of the network, the transmission device TRN does not receive the acknowledgement ACK relative to the packet PKT. After transmitting the packet PKT to the receiving device RCV, in the case of not receiving the acknowledgement ACK relative to the packet PKT within predetermined retransmission time out (RTO), the transmission device TRN transmits the packet PKT to the receiving device RCV again.

Meanwhile, when the packet retransmission control is performed, the order of the packet PKT arriving at the receiving device RCV is switched. Therefore, the receiving device PCV performs "packet reordering" of sorting the receiving packets PKT in order. It should be noted that the receiving packets PKT are classified into an "In-Order packet PKT-I" and an "Out-of-Order packet PKT-O". The In-Order packet PKT-I is a packet received in expected order. Meanwhile, the Out-of-Order packet PKT-O is a packet not in expected order, and a packet received in the case where the In-Order packet PKT-I is lost.

In general, the reordering of the receiving packet PKT is one of functions of a network protocol stack 10. The network protocol stack 10 is a means to provide a protocol function of a transport layer and a network layer. For example, the network protocol stack 10 provides a function of TCP/IP (Transport Control Protocol/Internet Protocol). Typically, the network protocol stack 10 is a part of a kernel program of an OS (Operating System) executed by a processing device. Alternatively, the network protocol stack 10 may be realized by a hardware such as a TCP/IP off-load engine. It should be noted that the network protocol stack 10 has not only the function of the packet reordering but also a function of the packet retransmission control.

According to the present embodiment, further, the packet reordering is also performed in a lower layer than the network protocol stack 10. Therefore, as shown in FIG. 1, the receiving device RCV is provided with a reordering section 3 and a buffer section 4 separately from the network protocol stack 10. The reordering section 3 performs the reordering of the receiving packet PKT in a lower layer than the network protocol stack 10 such as a MAC (Media Access Control) layer. The buffer section 4 is utilized for temporarily storing (buffering) the Out-of-Order packet PKT-O.

In more detail, when receiving the packet PKT from the transmission device TRN, the reordering section 3 determines whether the receiving packet PKT is the In-Order packet PKT-I or the Out-of-Order packet PKT-O. In the case where the receiving packet PKT is the In-Order packet PKT-I, the reordering section 3 transfers the receiving packet PKT-I to the network protocol stack 10 of an upper layer. Meanwhile, in the case where the receiving packet PKT is the Out-of-Order packet PKT-O, the reordering section 3 stores the receiving packet PKT-O in the buffer section 4 as far as possible. At this time, the receiving packet PKT-O is associated with a flow to which the packet belongs, and stored in the buffer section 4. That is, the Out-of-Order packet PKT-O is temporarily stored (buffered) in the buffer section 4 while being associated with the flow.

Further, in the case where the receiving packet PKT is the In-Order packet PKT-I of a certain flow and the Out-of-Order packet PKT-O of the same flow is already stored in the buffer section 4, the reordering section 3 performs the following processing. Firstly, the reordering section 3 transfers the In-Order receiving packet PKT-I to the network protocol stack 10 of the upper layer. After that, the reordering section 3 reads "all" the Out-of-Order packets PKT-O of the same flow stored in the buffer section 4, and transfers "all" the Out-of-Order packets PKT-O in order to the network protocol stack 10 of the upper layer.

The case where a single packet PKT is discarded will be taken into consideration. In this case, a "packet loss" is resolved by arrival of the In-Order packet PKT-I, and a series of the packets PKT of the flow are transferred to the network protocol stack 10 in order. That is, ISD (In Sequence Delivery) to the network protocol stack 10 from the lower layer is secured. Therefore, there is no need for performing the packet reordering in the network protocol stack 10, and the load applied onto the network protocol stack 10 is reduced.

The case of the burst discarding where the plurality of packets PKT is continuously discarded will be taken into consideration. In this case, even when one In-Order packet PKT-I arrives, the packet loss is not completely resolved.

However, according to the present embodiment, even in such a case, all the Out-of-Order packets PKT-O of the same flow stored in the buffer section 4 are transferred to the network protocol stack 10. That is, while the ISD is not secured, the packets of the flow are transferred to the network protocol stack 10. In this case, the network protocol stack 10 performs the packet reordering as usual.

As described above, according to the receiving device RCV of the present embodiment, the packet reordering is executed to some extent in the lower layer than the network protocol stack 10. As a result, an opportunity of the packet reordering in the network protocol stack 10 is decreased. That is, the load of the packet reordering applied onto the network protocol stack 10 is reduced. Since the network protocol stack 10 is required to provide various other functions, reduction of the load due to the packet reordering is favorable.

Further, according to the present embodiment, in the case where the In-Order packet PKT-I arrives, all the packets PKT of the flow are transmitted to the network protocol stack 10 irrespective of an arranging state of the packets PKT of the flow. Although described later, not only at the time of the arrival of the In-Order packet PKT-I but also in other opportunities, all the Out-of-Order packets PKT-O stored in the buffer section 4 may be transmitted to the network protocol stack 10. These indicate that the packet reordering is performed to some extent in the lower layer but not necessarily done so. In the lower layer, the packet reordering is performed as far as possible. However, in some cases, the lower layer entrusts the packet reordering to the network protocol stack 10 of the upper layer.

As a comparative example, a method described in the above patent literature (JP2007-281808A) will be taken into consideration. In the comparative example, in the case where the In-Order packet arrives, only the packets arranged in order are transferred to the upper layer. However, non-continuous packets are not transferred to the upper layer but remain in the buffer. That is, not all the Out-of-Order packets stored in the buffer are transferred to the upper layer. This method requires complicated processing in the lower layer and is not easily mounted in the receiving device.

Meanwhile, according to the present embodiment, in the lower layer, the packet reordering is performed as far as possible. However, in some cases, the packet reordering is entrusted to the network protocol stack 10 of the upper layer. Therefore, the reordering section 3 and the buffer section 4 can be realized with a simple configuration. The reordering section 3 and the buffer section 4 can be easily mounted in the receiving device RCV. At this time, there is no need for changing the existing network protocol stack 10. In such a way, according to the present embodiment, the load applied onto the network protocol stack 10 can be reduced, and cost can also be reduced.

2. Configuration Example

Figure 2:
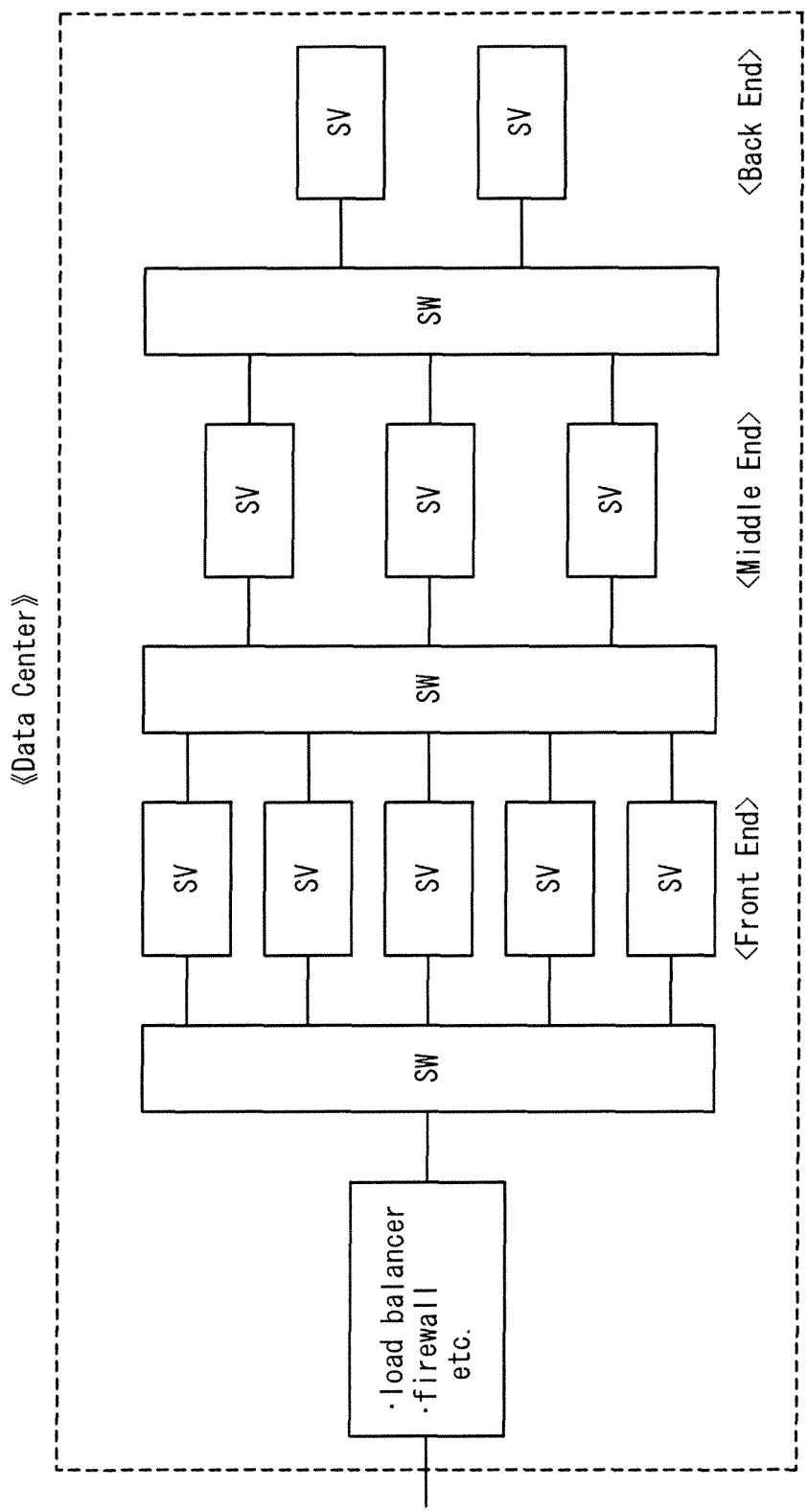
FIG. 2 is a concept diagram showing a configuration of a data center.

Hereinafter, the present embodiment will be described further in detail. As one example, a data center as shown in FIG. 2 will be taken into consideration. In the data center, a large number of servers SV are divided and arranged into a front end, a middle end, and a back end. Between the front end and the middle end, and between the middle end and the back end, a network of a switch SW is respectively placed. Performing packet communication between the servers SV in such a data center will be taken into consideration. The servers SV of transmitting the packets are the above transmission device TRN, and the servers SV of receiving the packets are the above receiving device RCV.

Figure 3:
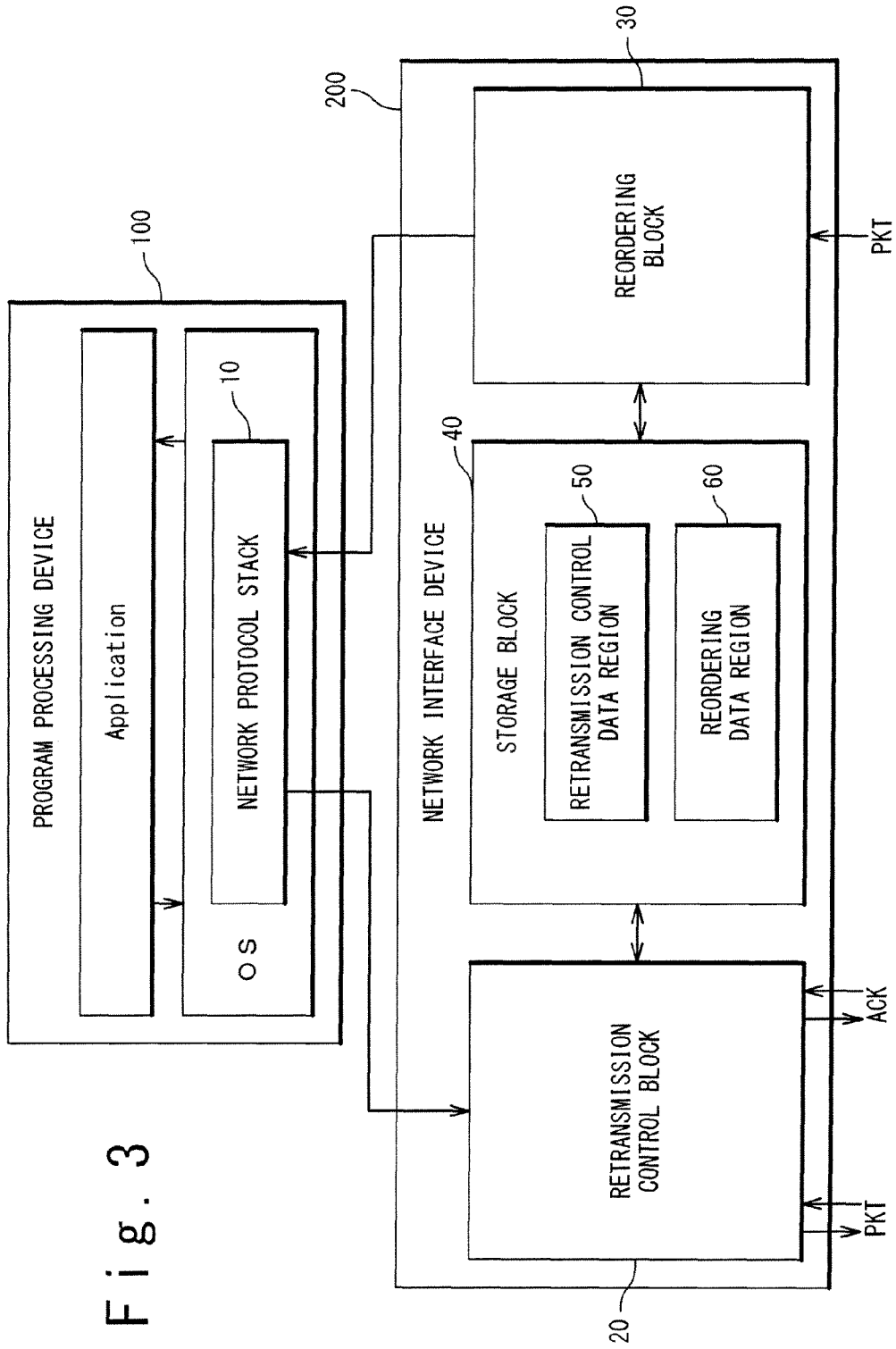
FIG. 3 is a block diagram showing a configuration example of a server in the embodiment of the present invention.

FIG. 3 shows a configuration example of one server SV (the transmission device TRN, the receiving device RCV). The server SV is provided with a program processing device 100 and a network interface device 200.

The program processing device 100 is provided with a CPU (Central Processing Unit) and executes various software programs including an application and the OS. In the present configuration example, the network protocol stack 10 is a part of the kernel program of the OS and realized by software. The network protocol stack 10 has the TCP/IP function including the packet retransmission control and the packet reordering.

The application performs network communication processing. Data required to be transmitted from the application is divided by size by which the data is transmittable to the network by the network protocol stack 10. A header of the transport layer is given to the divided data, and the data is transmitted to the network interface device 200 as the transmission packet.

The network interface device 200 is for example a NIC (Network Interface Card). This network interface device 200 provides a function of the MAC layer of the lower layer than the network protocol stack 10. As shown in FIG. 3, the network interface device 200 is provided with a retransmission control block 20, a reordering block 30, and a storage block 40. The retransmission control block 20, the reordering block 30, and the storage block 40 are realized by hardware.

The retransmission control block 20 performs the packet retransmission control in the lower layer than the network protocol stack 10. Specifically, the retransmission control block 20 of the transmission device TRN receives the transmission packet PKT from the network protocol stack 10 of the upper layer. Next, the retransmission control block 20 of the transmission device TRN transmits the transmission packet PKT to the receiving device RCV, and stores a copy of the transmission packet PKT in a retransmission control data region 50 (retransmission buffer) in the storage block 40. At this time, the retransmission control block 20 may give the header exclusive to the lower layer to the transmission packet PKT.

When receiving the packet PKT from the transmission device TRN, the retransmission control block 20 of the receiving device RCV acknowledges the receiving packet PKT and returns "acknowledgement ACK of the lower layer" to the retransmission control block 20 of the transmission device TRN. That is, the retransmission control block 20 on the receiving side corresponds to the acknowledgement section 2 in FIG. 1. It should be noted that description of the "acknowledgement ACK of the lower layer" is for distinction from the normal acknowledgement processed by the network protocol stack 10. Between the transmission device TRN and the receiving device RCV, as known, the packet retransmission control is also performed by the network protocol stack 10, and the same is applied to the present configuration example.

When receiving the "acknowledgement ACK of the lower layer" relative to the transmission packet PKT, the retransmission control block 20 of the transmission device TRN frees (deletes) the transmission packet PKT temporarily stored in the retransmission control data region 50. At this time, the retransmission control block 20 is terminated without giving the "acknowledgement ACK of the lower layer" to the upper layer. Meanwhile, after transmission of the transmission packet PKT, in the case of not receiving the "acknowledgement ACK of the lower layer" relative to the transmission packet PKT within predetermined retransmission time out (RTO), the retransmission control block 20 of the transmission device TRN retransmits the packet. Specifically, the retransmission control block 20 of the transmission device TRN reads the transmission packet PKT stored in the retransmission control data region 50, and transmits the transmission packet PKT to the receiving device RCV again.

In the present configuration example, there are two reasons below for performing the packet retransmission control in the lower layer than the network protocol stack 10. As a first reason, since the retransmission control block 20 of the lower layer performs the packet retransmission control, the load of the packet retransmission control applied onto the network protocol stack 10 of the upper layer is reduced.

As a second reason, the retransmission time out (RTO) is shortened as much as possible. For example, in the case of inter-server communication in the data center shown in FIG. 2, RTT (Round Trip Time) is significantly short, that is, a microsecond level. In this case, by shortening the retransmission time out to the microsecond level, FCT (Flow Completion Time) is decreased, so that communication efficiency can be improved. However, since the network protocol stack 10 is mounted in the OS, the retransmission time out cannot be shortened to the microsecond level in the packet retransmission control by the TCP. For example, since unit time (Jiffies) in Linux is 10 milliseconds, the retransmission time out cannot be shortened to less than 10 milliseconds by standard TCP of Linux. Thus, in the present configuration example, the retransmission control block 20 is provided in the lower layer than the network protocol stack 10. The packet retransmission control is performed with the retransmission time out shorter than the case of the network protocol stack 10 (e.g. microsecond level). Thereby, the FCT is decreased, so that the communication efficiency is improved.

The reordering block 30 of the network interface device 200 corresponds to the reordering section 3 in FIG. 1, and performs the "packet reordering" in the lower layer than the network protocol stack 10. Thereby, the load of the packet reordering applied onto the network protocol stack 10 is reduced. Packet reordering processing by the reordering block 30 according to the present embodiment will be described in detail later (refer to a third section).

The storage block 40 is for example a SRAM (Static Random Access Memory). This storage block 40 has a retransmission control data region 50 and a reordering data region 60. The retransmission control data region 50 is a retransmission buffer utilized in the packet retransmission control by the retransmission control block 20. The reordering data region 60 corresponds to the buffer section 4 in FIG. 1, and is utilized in the packet reordering by the reordering block 30.

Figures 4, 5:
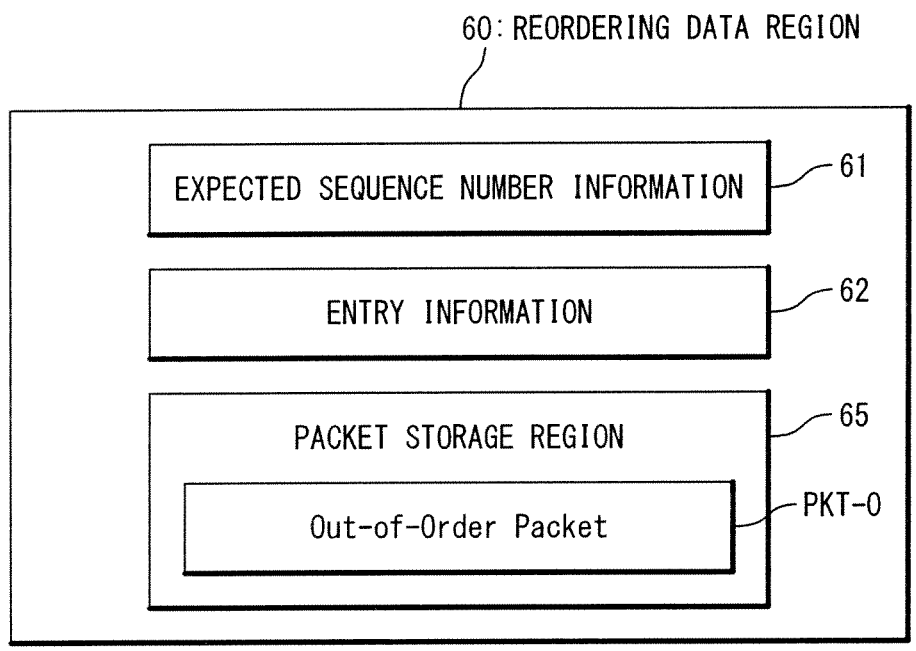
FIG. 4 is a concept diagram showing one example of a reordering data region in the embodiment of the present invention.
FIG. 5 is a concept diagram showing expected sequence number information in the embodiment of the present invention.

FIG. 4 is a concept diagram showing the reordering data region 60. The reordering data region 60 stores expected sequence number information 61 and at least one entry information 62. The reordering control data region 60 has at least one packet storage region 65.

FIG. 5 is a concept diagram showing the expected sequence number information 61. The expected sequence number information 61 indicates "expected sequence number ESQN" for each flow, and indicates a correspondence relationship between flow identification information and the expected sequence number ESQN. The flow identification information is information for specifying the flow, and is given in combination of a source MAC address, a destination MAC address, a source IP address, a destination IP address, and the like. This flow identification information can be extracted from the header of the packet PKT. The expected sequence number ESQN is sequence number of the packet PKT expected to be received next. The expected sequence number ESQN is expressed by the following expression (1).

[Expected Sequence Number ESQN]=[Maximum Value of Sequence Number of Packet Already Transferred to Upper Layer]+[Size of Packet of Maximum Sequence Number]   Expression (1):

The packet storage region 65 is a storage region of a predetermined capacity in which the Out-of-Order packet PKT-O is stored. The entry information 62 is management information of the Out-of-Order packet PKT-O stored in the packet storage region 65. The packet storage region 65 and the entry information 62 are provided for each flow. That is, one packet storage region 65 is assigned to one flow, the Out-of-Order packet PKT-O of a certain flow is stored in one packet storage region 65 assigned to the flow. The packet storage region 65 may be provided for one flow, or may be provided for a plurality of flows. In the case where the plurality of packet storage regions 65 is provided, the Out-of-Order packets PKT-O of the plurality of different flows can be buffered in parallel.

Figure 6:
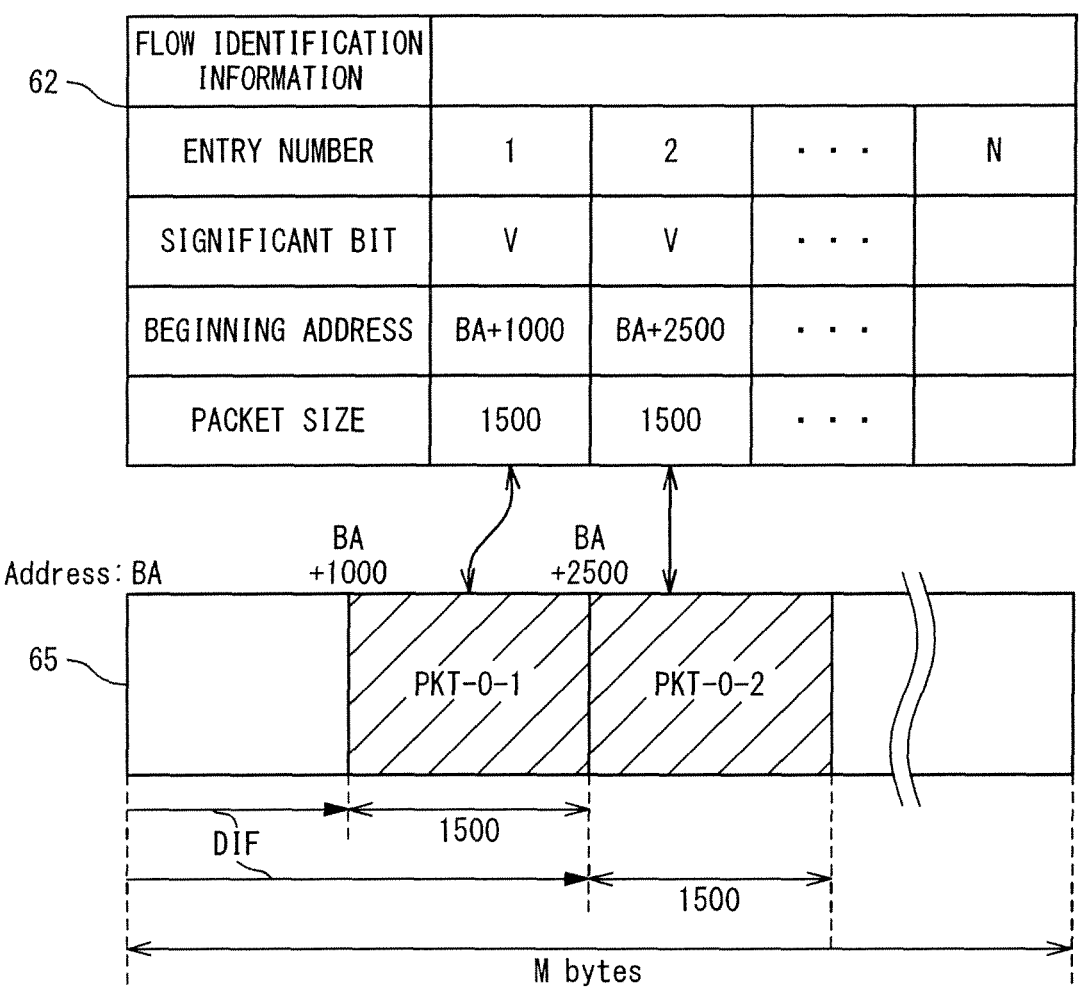
FIG. 6 is a concept diagram showing one example of entry information and a packet storage region in the embodiment of the present invention.

FIG. 6 shows an example of the entry information 62 and the packet storage region 65 with regard to a certain flow. The entry information 62 includes the flow identification information, entry number, significant bit, a beginning address, a packet size, and the like. The flow identification information indicates a flow to which the Out-of-Order packet PKT-O stored in the corresponding Packet storage region 65 belongs. The entry number is identification number for each Out-of-Order packet PKT-O stored in the corresponding packet storage region 65. In the present example, N Out-of-Order packets PKT-O (N is a natural number) at maximum can be stored in one packet storage region 65. The significant bit indicates whether each entry is being used or invalid. The beginning address is an address in the packet storage region 65 and indicates a beginning of storage destination of the Out-of-Order packet PKT-O of appropriate entry. The packet size indicates the size (packet length) of the Out-of-Order racket PKT-O stored in appropriate entry. In the example of FIG. 6, two Out-of-Order packets PKT-O-1, PKT-O-2 of a certain flow are buffered in the packet storage region 65. Size (capacity) of the entire packet storage region 65 is M bytes. The beginning address of the packet storage region 65 is a base address BA, the beginning address of the packet PKT-O-1 is "BA+1000", and the beginning address of the packet PKT-O-2 is "BA+2500".

3. Packet Reordering Processing

Figure 7:
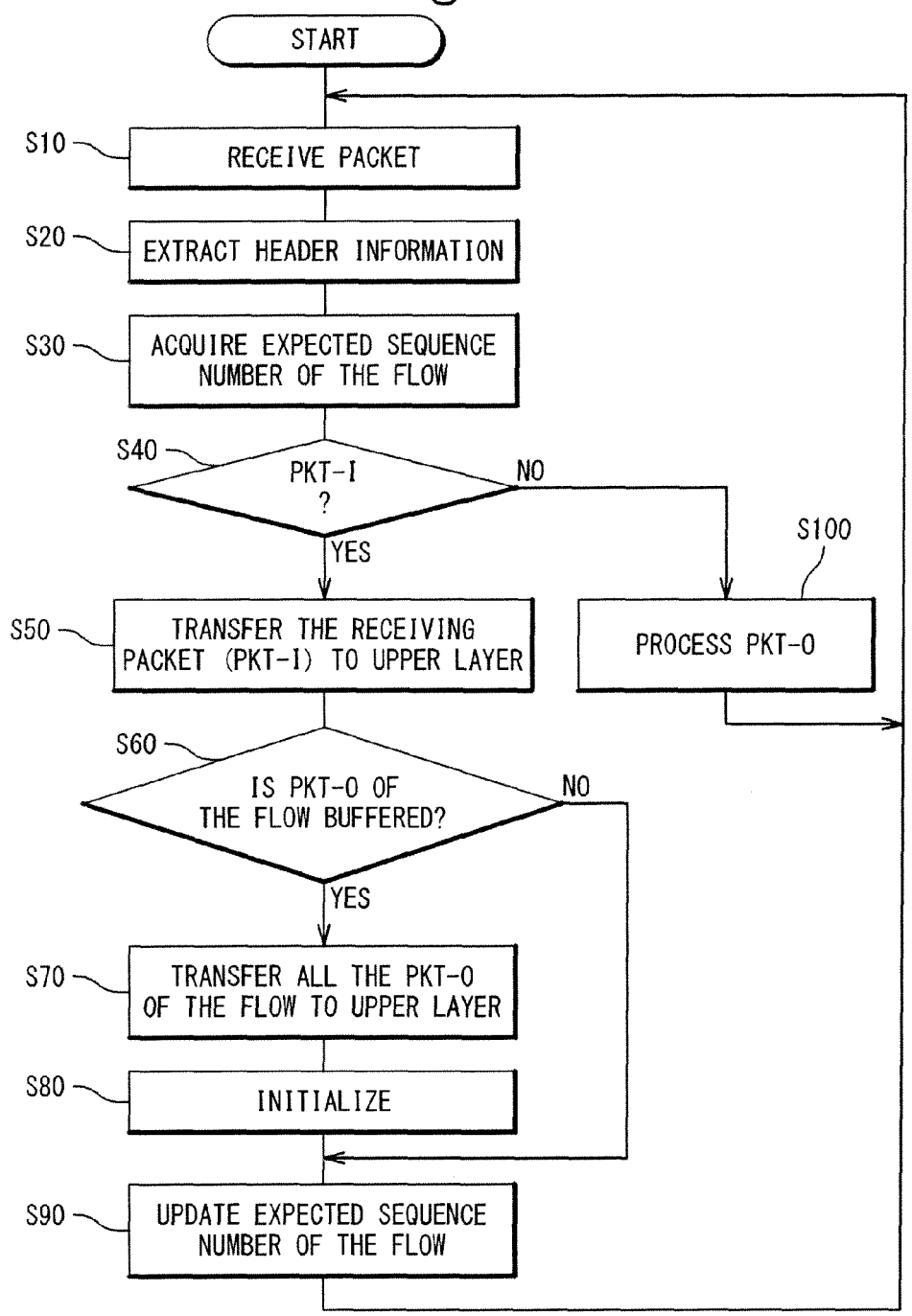
FIG. 7 is a flowchart showing packet reordering processing in the embodiment of the present invention.

Hereinafter, the packet reordering processing by the reordering block 30 according to the present embodiment will be described in detail. FIG. 7 is a flowchart showing the packet reordering processing in the present embodiment.

3-1. Basic Flow

Step S10:

The reordering block 30 receives the packet PKT of a certain flow from the transmission device TRN. In the following description, the receiving packet PKT will be regarded as a packet of a first flow.

Step S20:

The reordering block 30 extracts header information from the receiving packet PKT. The header information includes the sequence number with regard to the receiving packet PKT, the flow identification information, the packet size, and the like.

Step S30:

The reordering block 30 refers to the expected sequence number information 61 (refer to FIG. 5) in the storage block 40, and acquires the expected sequence number ESQN of the first flow.

Step S40:

The reordering block 30 determines whether or not the receiving packet PKT is the In-Order packet PKT-I based on the expected sequence number ESQN of the first flow and the sequence number of the receiving packet PKT. Specifically, the reordering block 30 compares the expected sequence number ESQN and the sequence number of the receiving packet PKT. In the case where the following conditional expression (2) is satisfied, that is, in the case where the sequence number of the receiving packet PKT matches with the expected sequence number ESQN, the reordering block 30 determines that the receiving packet PKT is the In-Order packet PKT-I.

[Sequence Number of Receiving packet]=[Expected Sequence Number ESQN]   Expression (2):

Step S50:

In the case where the receiving packet PKT is the In-Order packet PKT-I (Step S40; Yes), the reordering block 30 transfers the receiving packet PKT-I to the network protocol stack 10 of the upper layer.

Step S60:

Next, the reordering block 30 refers to the entry information 62 in the storage block 40, and checks whether or not the Out-of-Order packet PKT-O of the same first flow is already stored (buffered) in the packet storage region 65. In the case where the Out-of-Order packet PKT-O of the first flow is not stored in the packet storage region 65 (Step S60; No), the processing advances to Step S90.

Step S70:

In the case where the Out-of-Order packet PKT-O of the first flow is stored in the packet storage region 65 (Step S60; Yes), the reordering block 30 reads "all" the Out-of-Order packets PKT-O of the first flow stored in the packet storage region 65 in order. The reordering block 30 transfers "all" the Out-of-Order packets PKT-O of the first flow to the network protocol stack 10 of the upper layer in order.

Step S80:

After transferring all the Out-of-Order packets PKT-O of the first flow to the upper layer, the reordering block 30 initializes the entry information 62 corresponding to the first flow. Thereby, the packet storage region 65 assigned to the first flow by that time is freed, and becomes an unused region.

Step S90:

The reordering block 30 calculates new expected sequence number ESQN of the first flow according to the above expression (1), and updates the expected sequence number information 61.

Step S100:

Meanwhile, in the case where the receiving packet PKT is not the In-Order packet PKT-I but the Out-of-Order packet PKT-O (Step S40; No), the reordering block 30 process the receiving packet PKT-O of the first flow as follows.

3-2. Processing of PKT-O (Step S100)

Figure 8:
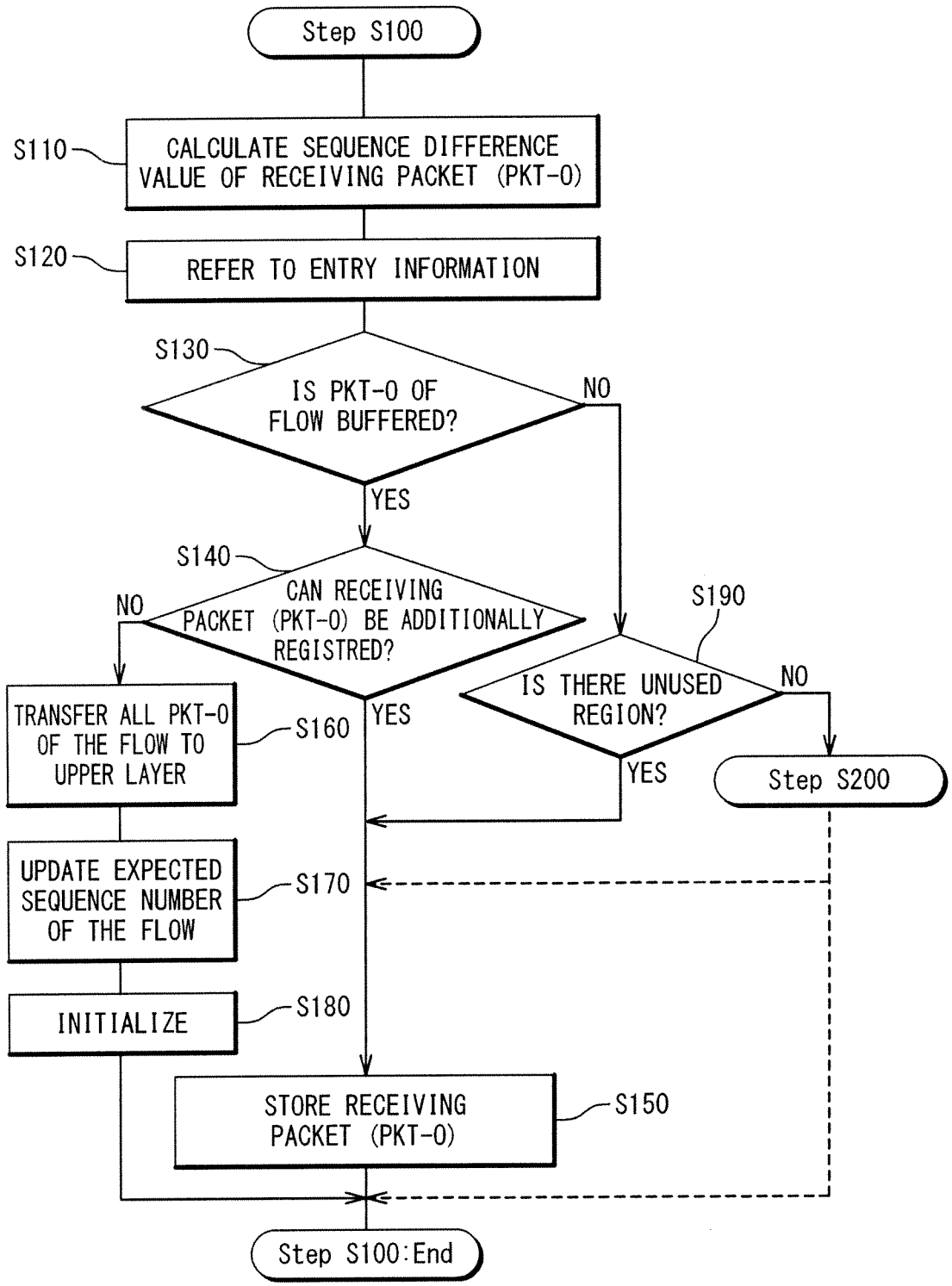
FIG. 8 is a flowchart showing Step S100 in the embodiment of the present invention.

FIG. 8 is a flowchart showing Step S100 in the present embodiment.

Step S110:

The reordering block 30 calculates a "sequence difference value DIF" with regard to the receiving packet PKT-O. The sequence difference value DIF is an indicator showing how different the receiving packet PKT-O is from the In-Order packet PKT-I. For example, the sequence difference value DIF is a difference between the sequence number of the receiving packet PKT-O and the expected sequence number ESQN, and is expressed by the following expression (3).

[Sequence Difference Value DIF]=[Sequence Number of Receiving packet]−[Expected Sequence Number ESQN]   Expression (3):

Step S120:

The reordering block 30 refers to the entry information 62 in the storage block 40.

Step S130:

The reordering block 30 refers to the entry information 62, and checks whether or not there is the packet storage region 65 assigned to the same first flow as the receiving packet PKT-O. That is, the reordering block 30 finds out whether or not the Out-of-Order packet PKT-O of the same first flow is already buffered.

Step 140:

In the case where the Out-of-Order packet PKT-O of the first flow is already buffered (Step S130; Yes), the reordering block 30 finds out whether or not the receiving packet PKT-O can be additionally registered to the packet storage region 65.

For example, as shown in FIG. 6, N Out-of-Order packets PKT-O (N is a natural number) at maximum can be stored in one packet storage region 65. By referring to the significant bit in the entry information 62, the reordering block 30 finds out the number of the Out-of-Order packet PKT-O stored in the packet storage region 65 assigned to the first flow. In the case where the N Out-of-Order Packets PKT-O are already stored in the packet storage region 65 assigned to the first flow, the reordering block 30 determines that the receiving packet PKT-O cannot be added to the packet storage region 65.

The size (capacity) of the entire packet storage region 65 is M bytes. In the case where there is no extra space for storing the receiving packet PKT-O in the packet storage region 65 assigned to the first flow, the reordering block 30 determines that the receiving packet PKT-O cannot be added to the packet storage region 65. For example, as described next, in the case where a write address is decided in accordance with the sequence difference value DIF, determination can be performed based on the sequence difference value DIF, the packet size, and the capacity of the packet storage region 65.

Step S150:

In the case where a determination result in Step S140 is "Yes" (Step S140; Yes), the reordering block 30 stores the receiving packet PKT-O in the packet storage region 65 assigned to the first flow. As shown in FIG. 6, the write address to the packet storage region 65 is decided in accordance with the sequence difference value DIF calculated by the above expression (3). That is, the write address is calculated by shifting the address from the base address BA by an amount in accordance with the sequence difference value DIF. As the sequence difference value DIF is increased, the receiving packet PKT-O is stored in a more back part in the packet storage region 65. Together with storage of the receiving packet PKT-O, the reordering block 30 updates the entry information 62 with regard to the first flow.

Step S160:

Meanwhile, in the case where the determination result in Step S140 is "No" (Step S140; No), the reordering block 30 transfers all the Out-of-Order packets PKT-O of the first flow to the network protocol stack 10 of the upper layer in order. The Out-of-Order packets PKT-O to be transferred include not only all the Out-of-Order packets PKT-O already stored in the packet storage region 65 assigned to the first flow but also the receiving packet PKT-O of this time. In this case, while the ISD is not secured, the packets of the first flow are transferred to the network protocol stack 10. Therefore, the network protocol stack 10 performs the packet reordering as usual.

Step S170:

The reordering block 30 calculates the new expected sequence number ESQN of the first flow according to the above expression (1), and updates the expected sequence number information 61.

Step S180:

The reordering block 30 initializes the entry information 62 corresponding to the first flow. Thereby, the packet storage region 65 assigned to the first flow by that time is freed, and becomes an unused region.

Step S190:

Next, the case where there is no packet storage region 65 assigned to the first flow in above Step S130 will be taken into consideration (Step S130; No). In this case, the reordering block 30 refers to the entry information 62 and finds out whether or not there is the unused packet storage region 65 in the reordering data region 60. In the case where there is the unused packet storage region 65 (Step S190; Yes), the reordering block 30 newly assigns the packet storage region 65 to the first flow, and executes Step S150.

Step S200:

Meanwhile, in the case where there is no more unused packet storage region 65 in the reordering data region 60 (Step S190; No), this indicates that the Out-of-Order packets PKT-O of other flows occupy the packet storage region 65. In this case, the reordering block 30 executes Step S200. There are various algorithms of Step S200 concerned as exemplified below.

First Example

Figure 9:
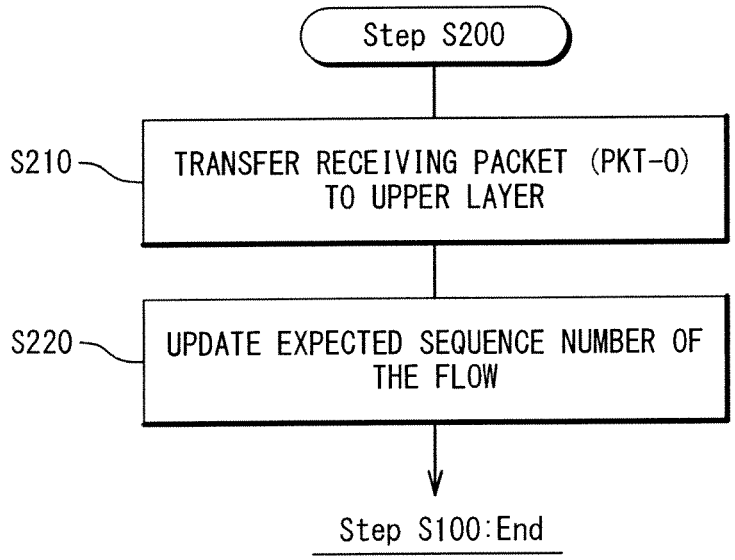
FIG. 9 is a flowchart showing a first example of Step S200 in the embodiment of the present invention.

FIG. 9 shows a first example of Step S200. The first example is the simplest algorithm of giving priority to other flows which are already buffered. The case where the number of the packet storage region 65 is only one, and the Out-of-Order packets PKT-O of a second flow which is different from the first flow are already stored in the one packet storage region 65 will be taken into consideration.

In this case, the reordering block 30 gives up buffering the receiving packet PKT-O of the first flow, and transfers the receiving packet PKT-O of the first flow to the network protocol stack 10 of the upper layer (Step S210). Further, the reordering block 30 calculates the new expected sequence number ESQN of the first flow according to the above expression (1), and updates the expected sequence number information 61 (Step S220). In this case, the network protocol stack 10 performs the packet reordering with regard to the first flow.

Second Example

Figure 10:
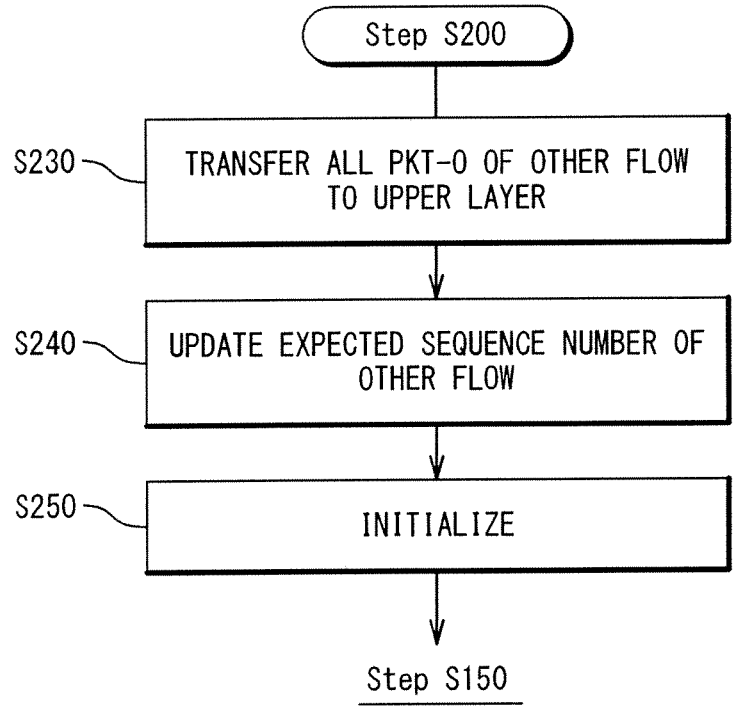
FIG. 10 is a flowchart showing a second example of Step S200 in the embodiment of the present invention.

FIG. 10 shows a second example of Step S200. The second example is the algorithm of giving priority to the flow of new reception conversely to the first example. The case where the number of the packet storage region 65 is also only one, and the Out-of-Order packet PKT-O of the second flow which is different from the first flow are already stored in the one packet storage region 65 will be taken into consideration.

In this case, the reordering block 30 transfers all the Out-of-Order packets PKT-O of the second flow stored in the packet storage region 65 to the network protocol stack 10 of the upper layer in order (Step S230). That is, while the ISD is not secured, the packets of the second flow are transferred to the network protocol stack 10. Therefore, the network protocol stack 10 performs the packet reordering with regard to the second flow.

The reordering block 30 calculates new expected sequence number ESQN of the second flow according to the above expression (1), and updates the expected sequence number information 61 (Step S240). The reordering block 30 initializes the entry information 62 corresponding to the second flow (Step S250). Thereby, the packet storage region 65 assigned to the second flow by that time is freed, and becomes an unused region. After that, the reordering block 30 newly assigns the unused packet storage region 65 to the first flow, and executes Step S150.

Third Example

Figure 11:
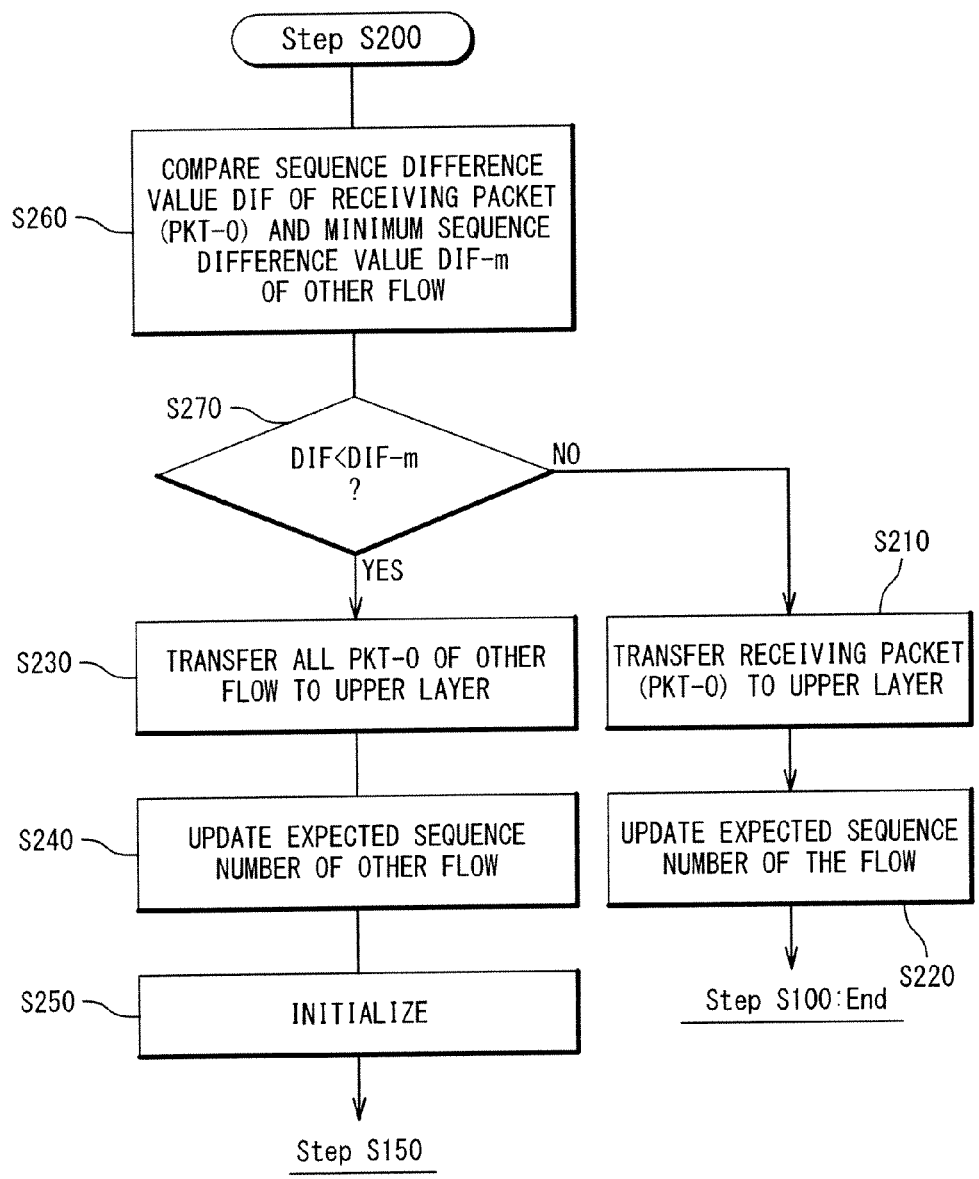
FIG. 11 is a flowchart showing a third example of Step S200 in the embodiment of the present invention.

FIG. 11 shows a third example of Step S200. The third example is combination of the first example and the second example. The case where the number of the packet storage region 65 is also only one, and the Out-of-Order packet PKT-O of the second flow which is different from the first flow are already stored in the one packet storage region 65 will be taken into consideration.

Firstly, the reordering block 30 refers to the entry information 62 with regard to the second flow and acquires a minimum sequence difference value DIF-m with regard to the second flow. In the example of FIG. 6, the minimum sequence difference value DIF-m is a value in accordance with a difference between the beginning address of the first packet PKT-O-1 and the base address BA. The reordering block 30 compares the sequence difference value DIF of the first flow obtained from the receiving packet PKT-O of this time and the minimum sequence difference value DIF-m of the second flow (Step S260).

In the case where the sequence difference value DIF of the first flow is not smaller than the minimum sequence difference value DIF-m of the second flow (Step S270; No), this indicates that a "packet loss" is less in the second flow. In this case, the reordering block 30 gives priority to the second flow and executes the same processing as in the above first example (Steps S210 to S220).

Meanwhile, in the case where the sequence difference value DIF of the first flow is smaller than the minimum sequence difference value DIF-m of the second flow (Step S270; Yes), this indicates that the "packet loss" is less in the first flow. In this case, the reordering block 30 gives priority to the first flow and executes the same processing as in the above second example (Steps S230 to S250, S150).

In such a way, in the third example, the packet reordering in the lower layer is preferentially performed to the flow with the smaller sequence difference DIF. The packet discarding includes discarding of a single packet due to the bit error or the like, and the burst discarding due to the network congestion. In the present example, it can be said that the reordering in the case of the discarding of the single packet among them is preferentially performed in the lower layer. Thereby, the packet loss is rapidly resolved and a decrease in throughput can be efficiently suppressed.

Fourth Example

Figure 12:
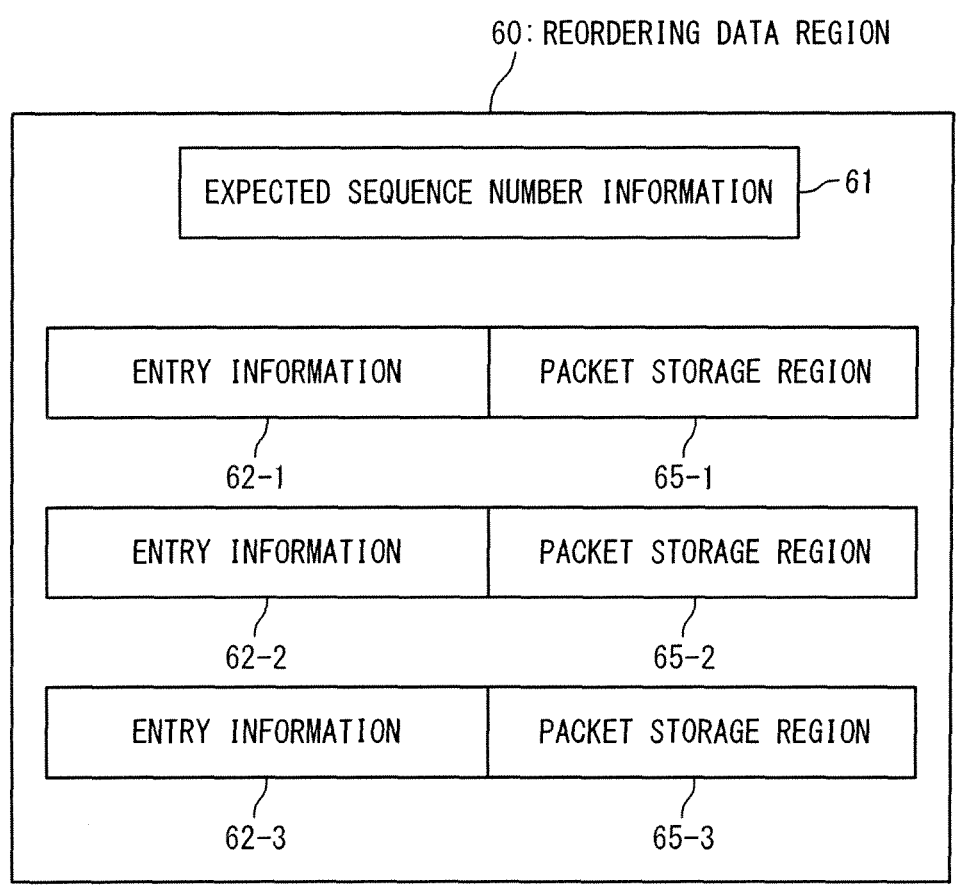
FIG. 12 is a concept diagram showing another example of the reordering data region in the embodiment of the Present invention.

In a fourth example, the reordering data region 60 corresponds to plural kinds of flows. As shown in FIG. 12, the entry information 62 and the packet storage regions 65 are provided for the plurality of flows in the reordering data region 60. Therefore, the packet reordering can be executed to the plurality of flows in parallel. For example, even when entry information 62-1 and a packet storage region 65-1 are already assigned to a flow A, entry information 62-2 and a packet storage region 65-2 can be assigned to another flow B.

Figure 13:
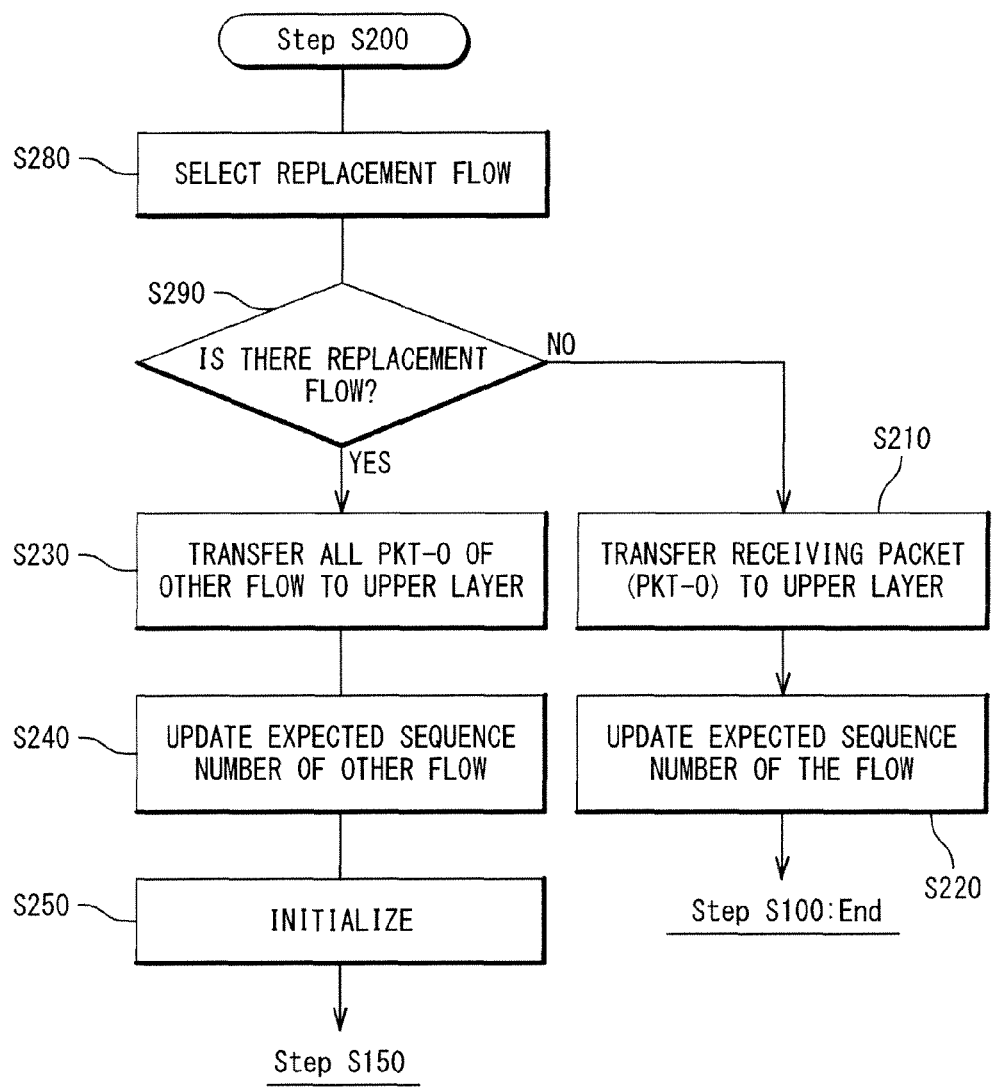
FIG. 13 is a flowchart showing a fourth example of Step S200 in the embodiment of the present invention.

FIG. 13 is a flowchart showing Step S200 in the fourth example. The case where there is no unused packet storage region 65, and the Out-of-Order packets PKT-O of a flow which is different from the first flow are already and respectively stored in the packet storage regions 65 will be taken into consideration. In this case, in order to buffer the receiving packet PKT-O of the first flow, the reordering block 30 attempts to free anyone of the plurality of packet storage regions 65. Hereinafter, the packet storage region 65 to be freed is referred to as the "replacement region", and the flow assigned to the replacement region is referred to as the "replacement flow".

Firstly, the reordering block 30 selects one replacement region among the plurality of packet storage regions 65, that is, selects one replacement flow among the plurality of existing flows (Step S280). As a selection algorithm for this, a random method and a round-robin method can be considered. As well as the above third example, a flow with the largest sequence difference value DIF may be selected as the replacement flow. However, it can also be considered that the sequence difference value DIF of the first flow to which the receiving packet PKT-O belongs is the largest. In that case, there is no replacement flow (Step S290; No), and the reordering block 30 executes the same processing as in the first example (Steps S210 to S220).

In the other case (Step S290; Yes), the reordering block 30 executes the same processing as in the second example to the selected replacement flow (Steps S230 to S250). That is, the reordering block 30 transfers all the Out-of-Order packets PKT-O stored in the selected replacement region to the network protocol stack 10, and frees the replacement region. After that, the reordering block 30 newly assigns the unused replacement region to the first flow and executes Step S150.

3-3. Timer Control

Figure 14:
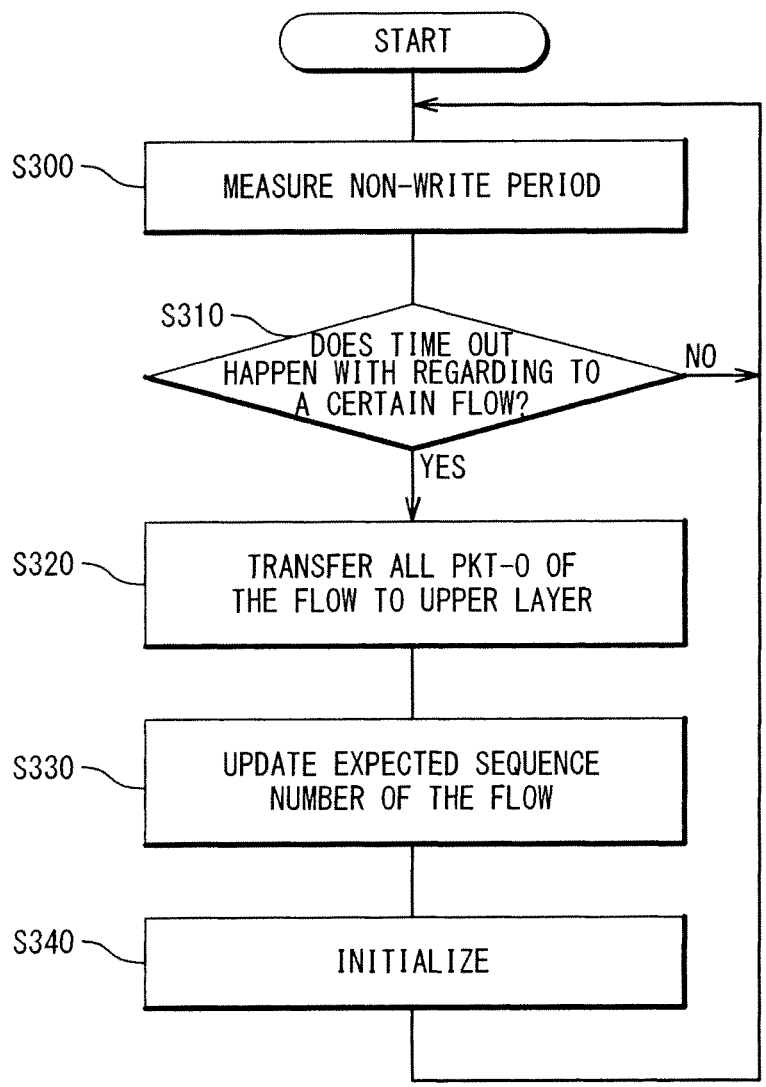
FIG. 14 is a flowchart showing packet reordering processing in the embodiment of the present invention.

In parallel to the above processing, processing as shown in FIG. 14 may be performed. The reordering block 30 has a timer for each packet storage region 65, and measures a "non-write period" with regard to the packet storage region 65 (Step S300). The non-write period is elapsed time from when the Out-of-Order packet PKT-O is written in the corresponding packet storage region 65 for the last time.

It is assumed that the non-write period exceeds a predetermined threshold value with regard to a certain packet storage region 65 (that is, a certain flow). That is, it is assumed that time out happens with regard to a certain flow (Step S310; Yes). In this case, the reordering block 30 transfers all the Out-of-Order packets PKT-O stored in the packet storage region 65 to the network protocol stack 10 in order (Step S320). Further, the reordering block 30 calculates new expected sequence number ESQN of the flow according to the above expression (1), and updates the expected sequence number information 61 (Step S330). The reordering block 30 initializes the entry information 62 of the flow, and frees the packet storage region 65 (Step S340).

Thereby, unnecessarily long occupancy of the packet storage region 65 is prevented. As a result, efficiency of the packet reordering by the reordering block 30 is improved. A capacity of the storage block 40 can be reduced.

3-4. Re-Order Flag

It should be noted that in the present embodiment, the reordering block 30 retains a "Re-Order flag" for each flow. An initial value of the Re-Order flag is "0". In the case where the Re-Order flag with regard to the flow of the receiving packet is "0", the reordering block 30 unconditionally determines that the receiving packet is the In-Order packet PKT-I in Step S40, and further, sets the Re-Order flag with regard to the flow to "1". Meanwhile, in the case where the Re-Order flag with regard to the flow of the receiving packet is "1", the reordering block 30 determines the In-Order packet PKT-I according to the above conditional expression (2) in Step S40.

described above, there is sometimes the case where the reordering block 30 acknowledges various triggers and transfers all the Out-of-Order packets PKT-O stored in the packet storage region 65 to the network protocol stack 10. In the case where such transfer processing of the Out-of-Order packets PKT-O is performed, the reordering block 30 re-sets the Re-Order flag of the flow to "0". After that, the packet of the same flow received for the first time is unconditionally determined to be the In-Order packet PKT-I.

4. Various Configuration Examples

Figure 15:
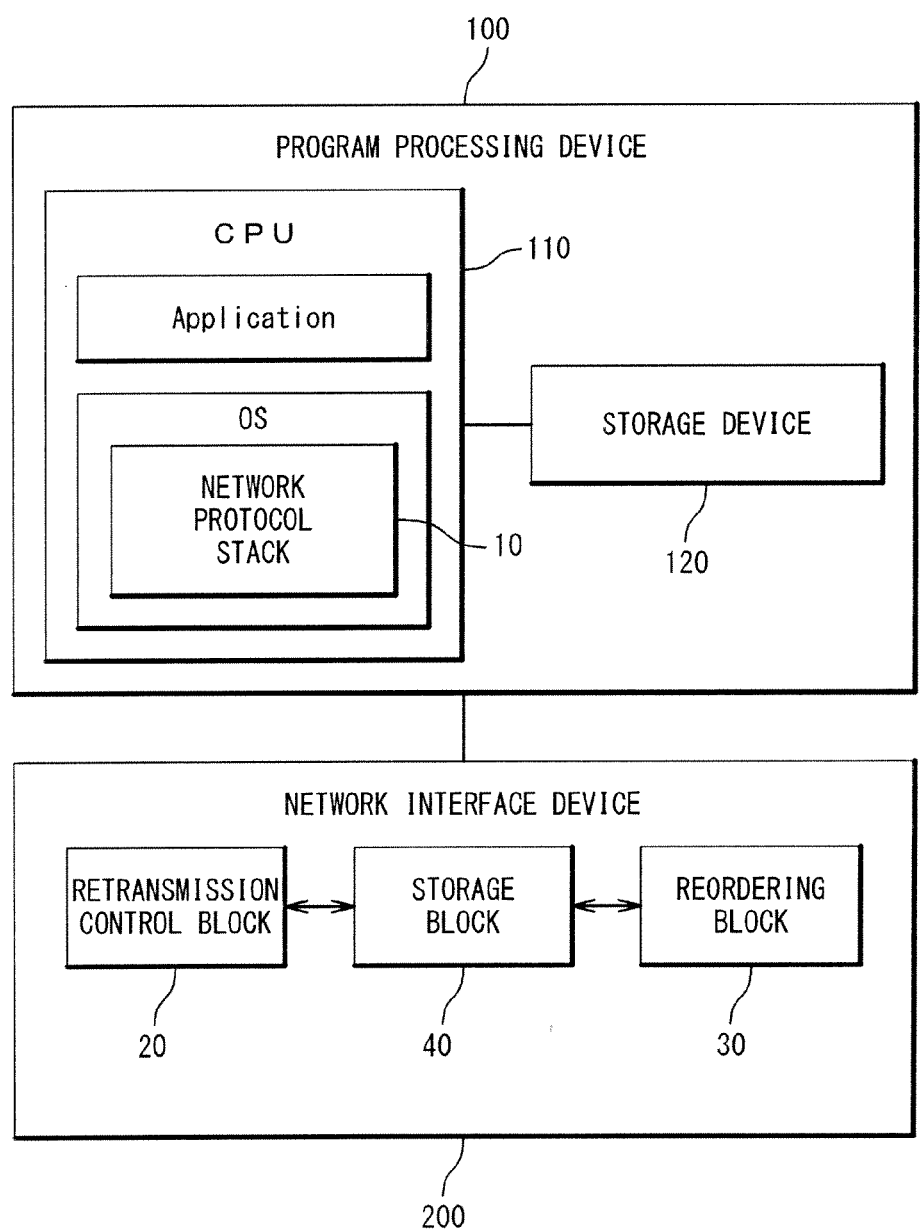
FIG. 15 is a block diagram showing one example of a configuration of the server in the embodiment of the present invention.

FIG. 15 shows one example of a configuration of the server in the present embodiment. The server is provided with the program processing device 100 and the network interface device 200. The program processing device 100 is provided with a CPU 110 and a storage device 120. The CPU 110 executes various software programs including the application and the OS. The network protocol stack 10 is a part of the kernel program of the OS and realized by software. The network interface device 200 is the network interface card (NIC) connected to the program processing device 100. This network interface device 200 is provided with the above retransmission control block 20, the reordering block 30, and the storage block 40. In this case, the retransmission control block 20, the reordering block 30, and the storage block 40 are realized by hardware.

Figure 16:
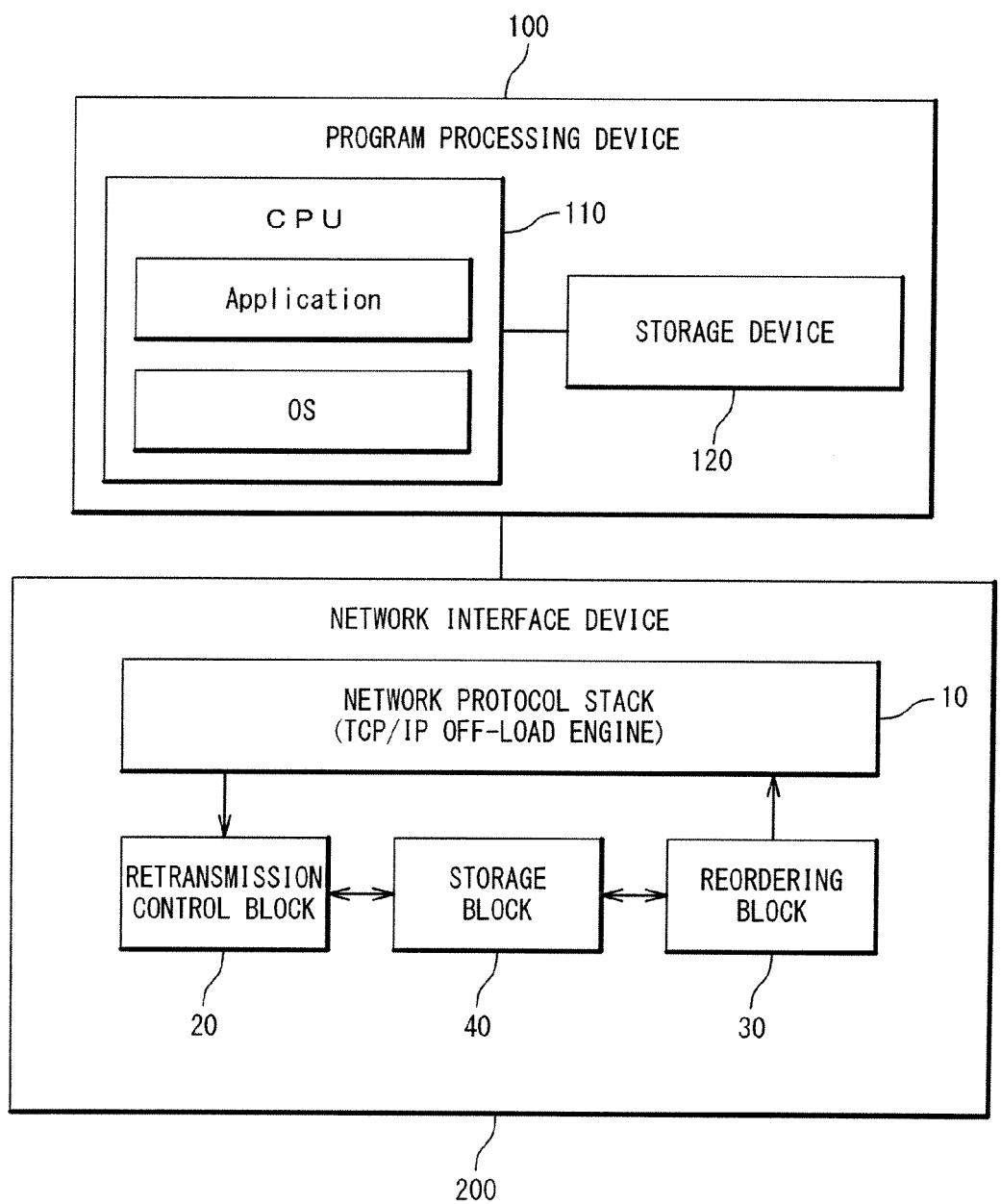
FIG. 16 is a block diagram showing one of other examples of the configuration of the server in the embodiment of the present invention.

FIG. 16 shows one of other examples of the configuration of the server in the present embodiment. In the present configuration example, the network protocol stack 10 is realized by hardware such as the TCP/IP off-load engine, and built into the network interface device 200. Other elements are the same as in the example shown in FIG. 15. With the present configuration example, the same effect is also obtained.

Figure 17:
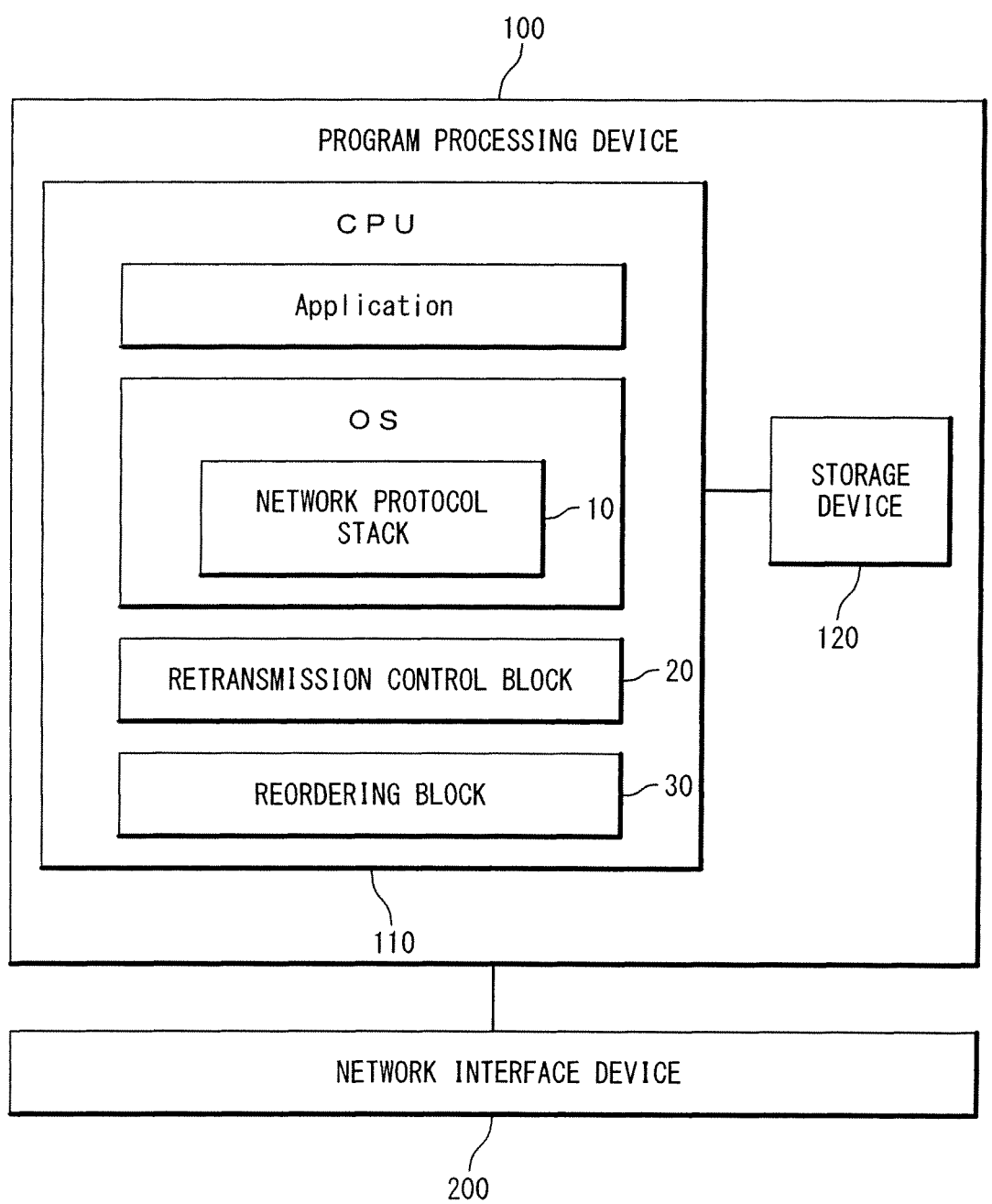
FIG. 17 is a block diagram showing further one of other examples of the configuration of the server in the embodiment of the present invention.

FIG. 17 shows further one of other examples of the configuration of the server in the present embodiment. In the present configuration example, the retransmission control block 20 and the reordering block 30 are realized by software processing. In more detail, the retransmission control block 20 and the reordering block 30 are provided as drivers. By executing the drivers by the CPU 110 of the program processing device 100, the retransmission control block 20 and the reordering block 30 are realized. There is no need for modifying the existing OS and the network protocol stack 10. It should be noted that the drivers (software) may be recorded in a computer-readable recording medium. The storage device 120 of the program processing device 100 serves as the storage block 40. With the present configuration example, the same effect is also obtained.

Figure 18:
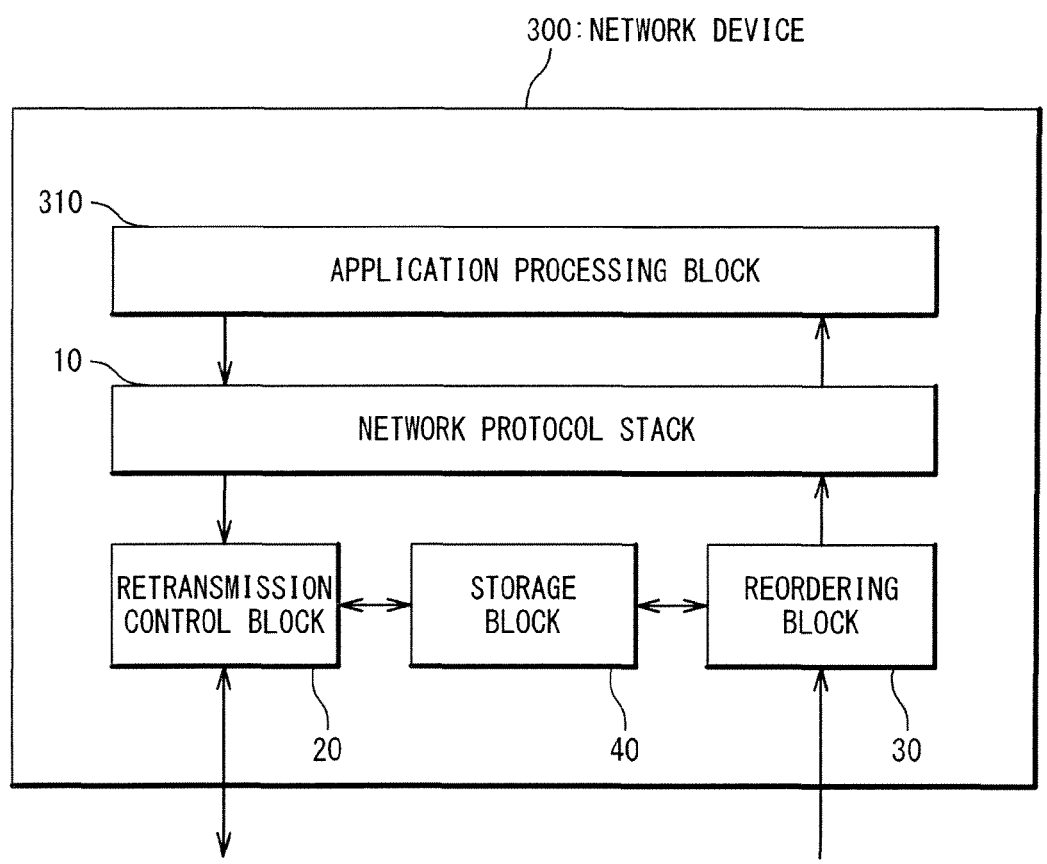
FIG. 18 is a block diagram showing a configuration example of a network device in the embodiment of the present invention.

FIG. 18 shows a configuration example in the case of a network device 300 such as an application router. The network device 300 is provided with an application processing block 310 for executing the application, the network protocol stack 10, the retransmission control block 20, the reordering block 30, and the storage block 40. All these are realized by hardware. With the present configuration example, the same effect is also obtained.

The embodiment of the present invention is described above with reference to the attached drawings. However, the present invention is not limited to the above embodiment but can be appropriately modified by those skilled in the art within a range not departing from the gist.

The present application claims priority based on Japanese Patent Application No. 2009-275930 filed on 3 Dec. 2009, and all the disclosure thereof is taken in this application.

The invention claimed is:

1. A packet receiving device comprising:
an acknowledgement section configured to acknowledge a receiving packet received from a packet transmission device and return an acknowledgement to said packet transmission device;
a network protocol stack having a function of performing a reordering of said receiving packet by guaranteeing an in-order delivery;
a reordering section configured to perform a reordering of said receiving packet in a lower layer than said network protocol stack without guaranteeing an in-order delivery; and
a buffer section in which an Out-of-order packet included in said receiving packet is stored while being associated with a flow,
wherein said packet transmission device is configured to retransmit said transmission packet in a case where said acknowledgement relative to said transmission packet is not received within a predetermined time after transmitting said transmission packet,
wherein said reordering section is configured to determine whether said receiving packet is an In-Order packet or an Out-of-Order packet,
wherein said reordering section is configured to transfer said receiving packet to said network protocol stack in a case where said receiving packet is an In-Order packet,
wherein said reordering section is configured to transfer, in a case where said receiving packet is an In-Order packet of a given flow and an Out-of-Order packet of said given flow is stored in said buffer section, said receiving packet to said network protocol stack and then transfer all of said Out-of-Order packet of said flow stored in said buffer section to said network protocol stack,
wherein said receiving packet comprises an Out-of-Order packet of a first flow,
wherein said reordering section is configured to find out whether an Out-of-Order packet of said first flow is already stored in said buffer section,
wherein said reordering section is configured to find out, in a case where an Out-of-Order packet of said first flow is already stored in said buffer section, whether said receiving packet can be additionally stored in said buffer section,
wherein said reordering section is configured to associate, in a case where said receiving packet can be additionally stored in said buffer section, said receiving packet to said first flow and then additionally store said receiving packet in said buffer section, and
wherein said reordering section is configured to transfer, in a case where said receiving packet cannot be additionally stored in said buffer section, all of said Out-of-Order packet of said first flow to said network protocol stack.

2. The packet receiving device according to claim 1,
wherein N Out-of-Order packets at maximum can be stored in said buffer section, wherein N is a natural number, and
wherein said reordering section is configured to determine, in a case where N Out-of-Order packets of said first flow are already stored in said buffer section, that said receiving packet cannot be additionally stored in said buffer section.

3. The packet receiving device according to claim 2,
wherein said buffer section comprises a packet storage region with a given capacity,
wherein an Out-of-Order packet of said first flow is already stored in said packet storage region, and
wherein said reordering section is configured to determine, in a case where there is no more capacity in said packet storage region to store said receiving packet, that said receiving packet cannot be additionally stored in said buffer section.

4. The packet receiving device according to claim 3,
wherein said buffer section comprises at least one packet storage region,
wherein each of said at least one packet is associated with a flow, respectively, and
wherein an Out-of-Order packet of said flow is stored in said packet storage region which is associated with said flow.

5. The packet receiving device according to claim 4,
wherein a number of said packet storage region is one, and
wherein said reordering section is configured to transfer, in a case where an Out-of-Order packet of a second flow which is different from said first flow is already stored in said one packet storage region, said receiving packet to said network protocol stack.

6. The packet receiving device according to claim 5, further comprising:
a program processing device configured to execute an OS (Operating System); and
a network interface device connected to said program processing device,
wherein said network protocol stack is mounted in said OS, and
wherein said reordering section and said buffer section are included in said network interface device.

7. The packet receiving device according to claim 5, further comprising:
a program processing device configured to execute an OS (Operating System); and
a network interface device connected to said program processing device,
wherein said network protocol stack is built as an off-load engine in said network interface device, and
wherein said reordering section and said buffer section are included in said network interface device.

8. The packet receiving device according to claim 4,
wherein a number of said packet storage region is one, and
wherein said reordering section is configured to transfer, in a case where an Out-of-Order packet of a second flow which is different from said first flow is already stored in said one packet storage region, all of said Out-of-Order packet of said second flow stored in said one packet storage region to said network protocol stack, associate said receiving packet with said first flow and store said receiving packet in said one packet storage region.

9. The packet receiving device according to claim 8, further comprising:
a program processing device configured to execute an OS (Operating System); and
a network interface device connected to said program processing device,
wherein said network protocol stack is mounted in said OS, and
wherein said reordering section and said buffer section are included in said network interface device.

10. The packet receiving device according to claim 8, further comprising:
a program processing device configured to execute an OS (Operating System); and
a network interface device connected to said program processing device, wherein said network protocol stack is built as an off-load engine in said network interface device, and
wherein said reordering section and said buffer section are included in said network interface device.

11. The packet receiving device according to claim 4,
wherein a sequence difference value comprises a difference between a sequence number of said receiving packed and an expected sequence number of said receiving packet,
wherein a number of said packet storage region is one,
wherein said reordering section is configured to compare, in a case where an Out-of-Order packet of a second flow which is different from said first flow is already stored in said one packet storage region, said sequence difference value between said first flow and said second flow,
wherein said reordering section is configured to transfer, in a case where said sequence difference value of said first flow is larger than said sequence difference value of said second flow, said receiving packet to said network protocol stack, and
wherein said reordering section is configured to transfer, in a case where said sequence difference value of said first flow is smaller than said sequence difference value of said second flow, all of said Out-of-Order packet of said second flow stored in said one packet storage region to said network protocol stack, associate said receiving packet with said first flow and store said receiving packet in said one packet storage region.

12. The packet receiving device according to claim 11, further comprising:
a program processing device configured to execute an OS (Operating System); and
a network interface device connected to said program processing device,
wherein said network protocol stack is mounted in said OS, and
wherein said reordering section and said buffer section are included in said network interface device.

13. The packet receiving device according to claim 11, further comprising:
a program processing device configured to execute an OS (Operating System); and
a network interface device connected to said program processing device,
wherein said network protocol stack is built as an off-load engine in said network interface device, and
wherein said reordering section and said buffer section are included in said network interface device.

14. The packet receiving device according to claim 4,
wherein a number of said packet storage region is a plurality,
wherein said reordering section is configured to select, in a case where an Out-of-Order packet of a flow which is different from said first flow is already stored in said plurality of packet storage regions, one among said plurality of packet storage regions, and
wherein said reordering section is configured to transfer all of said Out-of-Order packet stored in said selected packet storage region, associate said receiving packet with said first flow and store said receiving packet to said selected packet storage region.

15. The packet receiving device according to claim 14, further comprising:
a program processing device configured to execute an OS (Operating System); and
a network interface device connected to said program processing device,
wherein said network protocol stack is mounted in said OS, and
wherein said reordering section and said buffer section are included in said network interface device.

16. The packet receiving device according to claim 14, further comprising:
a program processing device configured to execute an OS (Operating System); and
a network interface device connected to said program processing device,
wherein said network protocol stack is built as an off-load engine in said network interface device, and
wherein said reordering section and said buffer section are included in said network interface device.

17. The packet receiving device according to claim 4, further comprising:
a program processing device configured to execute an OS (Operating System); and
a network interface device connected to said program processing device,
wherein said network protocol stack is mounted in said OS, and
wherein said reordering section and said buffer section are included in said network interface device.

18. The packet receiving device according to claim 4, further comprising:
a program processing device configured to execute an OS (Operating System); and
a network interface device connected to said program processing device,
wherein said network protocol stack is built as an off-load engine in said network interface device, and
wherein said reordering section and said buffer section are included in said network interface device.

19. A packet communication system comprising:
a packet transmission device configured to transmit a transmission packet; and
a packet receiving device configured to receive said transmission packet from said packet transmission device as a receiving packet,
wherein said packet receiving device comprises:
an acknowledgement section configured to acknowledge said receiving packet and return an acknowledgement to said packet transmission device;
a network protocol stack having a function of performing a reordering of said receiving packet;
a reordering section configured to perform a reordering of said receiving packet in a lower layer than said network protocol stack; and
a buffer section in which an Out-of-order packet included in said receiving packet is stored while being associated with a flow,
wherein said packet transmission device is configured to perform, in a case where said acknowledgement relative to said transmission packet is not received within a predetermined time after a transmission of said transmission packet to said receiving device, a packet retransmission control to transmit said transmission packet to said packet receiving device again,
wherein said reordering section is configured to determine whether said receiving packet is an In-Order packet or an Out-of-Order packet,
wherein said reordering section is configured to transfer said receiving packet to said network protocol stack in a case where said receiving packet is an In-Order packet,
wherein said reordering section is configured to transfer, in a case where said receiving packet is an In-Order packet of a given flow and an Out-of-Order packet of said given flow is stored in said buffer section, said receiving packet to said network protocol stack and then transfer all of said Out-of-Order packet of said flow stored in said buffer section to said network protocol stack, wherein said receiving packet comprises an Out-of-Order packet of a first flow, wherein said reordering section is configured to find out whether an Out-of-Order packet of said first flow is already stored in said buffer section, wherein said reordering section is configured to find out, in a case where an Out-of-Order packet of said first flow is already stored in said buffer section, whether said receiving packet can be additionally stored in said buffer section, wherein said reordering section is configured to associate, in a case where said receiving packet can be additionally stored in said buffer section, said receiving packet to said first flow and then additionally store said receiving packet in said buffer section, and wherein said reordering section is configured to transfer, in a case where said receiving packet cannot be additionally stored in said buffer section, all of said Out-of-Order packet of said first flow to said network protocol stack.

20. The packet communication system according to claim 19, wherein said packet transmission device comprises a retransmission control section configured to perform said packet retransmission control in a lower layer than a network protocol stack.

21. A packet reordering method in a packet receiving device, wherein said packet receiving device comprises:
an acknowledgement section configured to acknowledge a receiving packet received from a packet transmission device;
a network protocol stack having a function of performing a reordering of said receiving packet; and
a buffer section in which an Out-of-Order packet is stored while being associated with a flow, wherein said packet transmission device is configured to retransmit, in a case where said acknowledgement relative to said transmission device is not received within a predetermined time after said transmission packet;

wherein said packet reordering method comprises:
performing a reordering of said transmission packet in a lower layer than said network protocol stack, and
wherein performing said reordering comprises:
determining whether said receiving packet is an In-Order packet or an Out-of-Order packet;
transferring, in a case where said receiving packet is an In-Order packet, said receiving packet to said network protocol stack; and
transferring, in a case where said receiving packet is an In-Order packet of a flow and said Out-of-Order packet of said flow is stored in said buffer section, said receiving packet to said network protocol stack and then transferring all of Out-of-Order packet of said flow stored in said buffer section to said network protocol stack, wherein said receiving packet comprises an Out-of-Order packet of a first flow, and wherein said reordering further includes:
finding out whether an Out-of-Order packet of said first flow is already stored in said buffer section;
finding out, in a case where an Out-of-Order packet of said first flow is already stored in said buffer section, whether said receiving packet can be additionally stored in said buffer section,
associating, in a case where said receiving packet can be additionally stored in said buffer section, said receiving packet to said first flow and then additionally store said receiving packet in said buffer section, and
transferring, in a case where said receiving packet cannot be additionally stored in said buffer section all of said Out-of-Order packet of said first flow to said network protocol stack.

22. A non-transitory computer-readable recording medium configured to store a packet reordering program for executing a packet reordering process with a packet receiving device, wherein said packet receiving device comprises:
an acknowledgement section configured to acknowledge a receiving packet received from a packet transmission device;
a network protocol stack having a function of performing a reordering of said receiving packet; and
a buffer section in which an Out-of-Order packet is stored while being associated with a flow, wherein said packet transmission device is configured to retransmit, in a case where said acknowledgement relative to said transmission device is not received within a predetermined time after said transmission packet;

wherein said packet reordering process comprises:
performing a reordering of said transmission packet in a lower layer than said network protocol stack, and
wherein performing said reordering comprises:
determining whether said receiving packet is an In-Order packet or an Out-of-Order packet;
transferring, in a case where said receiving packet is an In-Order packet, said receiving packet to said network protocol stack; and
transferring, in a case where said receiving packet is an In-Order packet of a flow and said Out-of-Order packet of said flow is stored in said buffer section, said receiving packet to said network protocol stack and then transferring all of Out-of-Order packet of said flow stored in said buffer section to said network protocol stack, wherein said receiving packet comprises an Out-of-Order packet of a first flow, and wherein said reordering further includes:
finding out whether an Out-of-Order packet of said first flow is already stored in said buffer section;
finding out, in a case where an Out-of-Order packet of said first flow is already stored in said buffer section, whether said receiving packet can be additionally stored in said buffer section,
associating, in a case where said receiving packet can be additionally stored in said buffer section, said receiving packet to said first flow and then additionally store said receiving packet in said buffer section, and
transferring, in a case where said receiving packet cannot be additionally stored in said buffer section, all of said Out-of-Order packet of said first flow to said network protocol stack.

* * * * *